United States Patent [19]
Martinez

[11] Patent Number: 4,750,036
[45] Date of Patent: Jun. 7, 1988

[54] INTERACTIVE TELEVISION AND DATA TRANSMISSION SYSTEM

[75] Inventor: Louis Martinez, Cerritos, Calif.

[73] Assignee: Radio Telcom & Technology, Inc., Cerritos, Calif.

[21] Appl. No.: 863,101

[22] Filed: May 14, 1986

[51] Int. Cl.$^4$ .................. H04N 7/093; H04N 7/08; H04N 7/00

[52] U.S. Cl. .................. 358/147; 358/142; 358/84

[58] Field of Search .................. 358/84, 86, 141, 142, 358/145, 146, 147; 375/43, 61, 77; 455/47, 49, 51, 53, 57, 104, 109, 204

[56] References Cited

U.S. PATENT DOCUMENTS

| | | | |
|---|---|---|---|
| 3,529,081 | 9/1970 | Rider | 358/147 |
| 4,074,199 | 2/1978 | de Jager et al. | 375/61 |
| 4,155,039 | 5/1979 | Lechevin | 455/53 |
| 4,177,405 | 9/1979 | Martinez | 455/51 |
| 4,208,630 | 6/1980 | Martinez | 455/51 |
| 4,231,114 | 10/1980 | Dolikian | 455/53 |
| 4,513,415 | 4/1985 | Martinez | 455/53 |
| 4,538,174 | 8/1985 | Gargini et al. | 358/147 |
| 4,578,815 | 3/1986 | Persinotti | 455/51 |
| 4,591,906 | 5/1986 | Morales-Garza et al. | 358/84 |
| 4,622,694 | 11/1986 | Weber et al. | 455/47 |

OTHER PUBLICATIONS

"T-Net Related Inventions Summary of Patent Search", by Martinez; Radio Telecom & Technology Inc., TM 3140-1B, 1986.

Primary Examiner—James J. Groody
Assistant Examiner—Michael D. Parker
Attorney, Agent, or Firm—Blakely, Sokoloff, Taylor & Zafman

[57] ABSTRACT

A spread spectrum system provides bidirectional digital communication on a vacant television (TV) channel for simultaneous use by more than 75,000 subscribers using time and frequency division multiplex signals locked to horizontal and vertical sync pulses of an adjacent channel Host TV station. The system, whose operation is analogous to a radar system, comprises: (1) the Host TV station to send down-link sync and data pulses to subscribers during the horizontal blanking interval (HBI), (2) subscriber "transponders" which detect those signals and transmits up-link "echo" data pulses only during the HBI to eliminate interference to TV viewers, and (3) a central receiver which also uses the host TV sync pulses to trigger range gates to detect the up-link data pulses. In a preferred embodiment the central receiver employs directional antennas to determine direction to transponders and to define angular sectors partitioning the service area into pie-link "cells" which permit frequency re-use in non-contiguous sectors (like cellular radio). The system thus operates like a radar to measure elapsed time between receipt of TV sync pulses and receipt of transponder response pulses and measures bearing to transponders to thereby determine the location of fixed or mobile subscribers as well as provide data links to them. Transponders may share user's existing TV antenna or may operate on cable TV and could be packaged and "RF modems" for personal computers, as transceivers for mobile or portable use, or they may be integrated with a TV receiver to provide "interactive television".

63 Claims, 24 Drawing Sheets

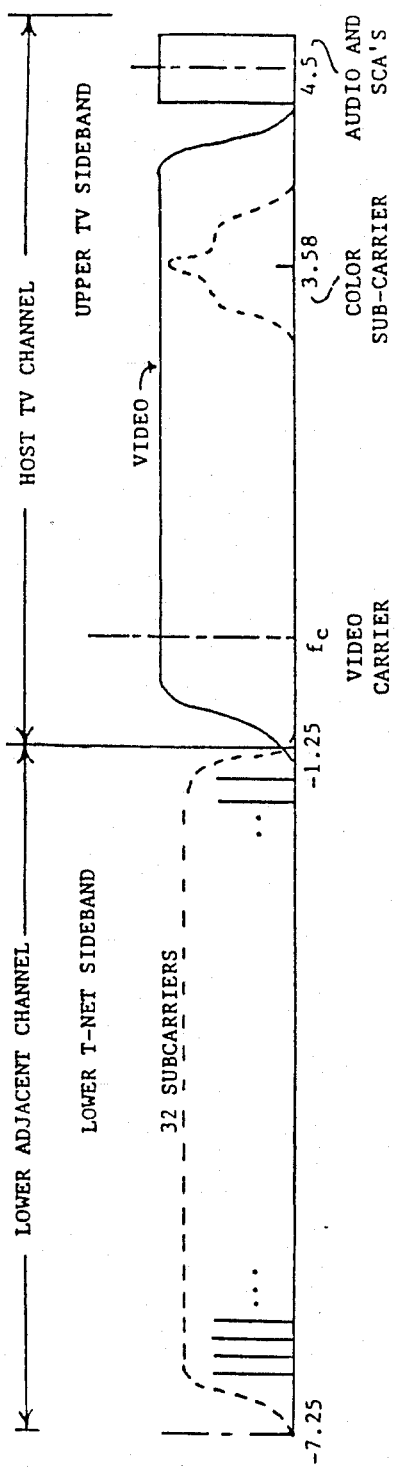
FIG.9A
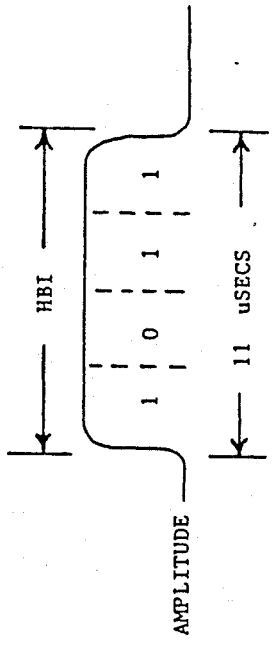
FIG.9B
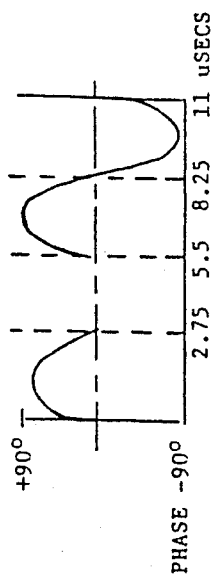

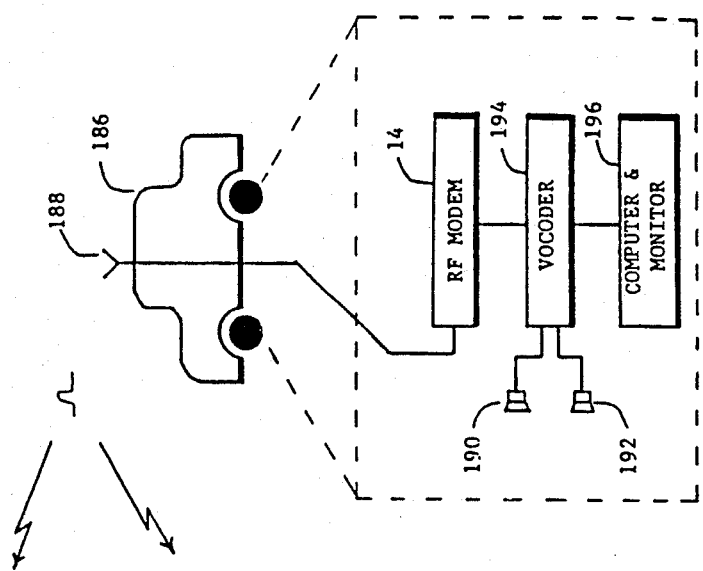
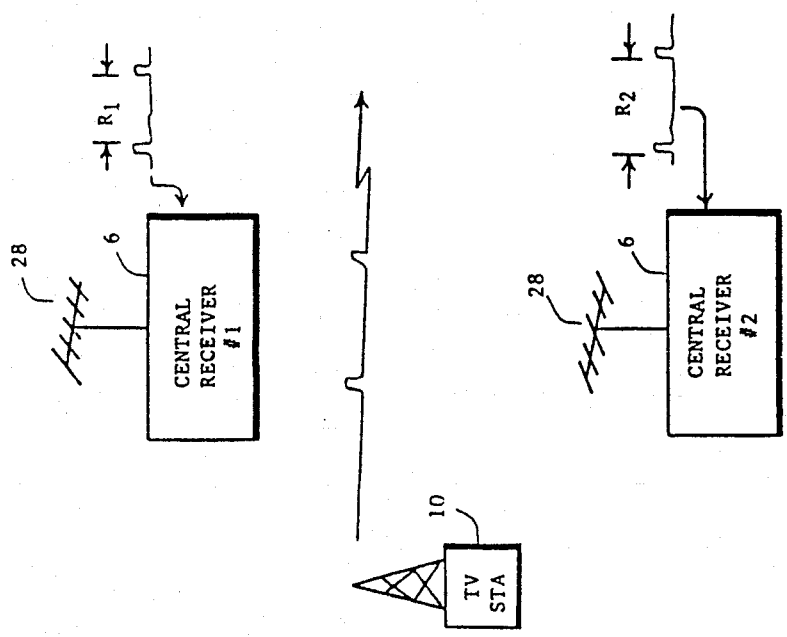
FIG. 18

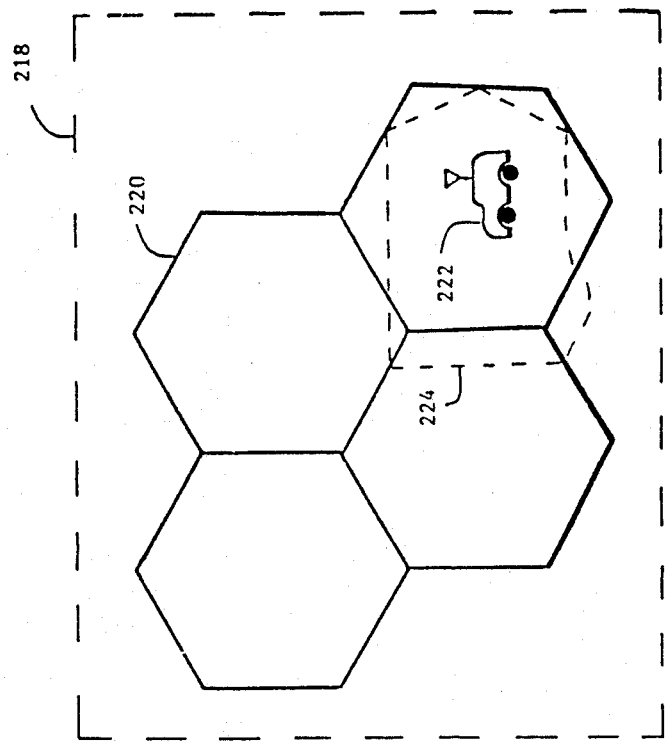
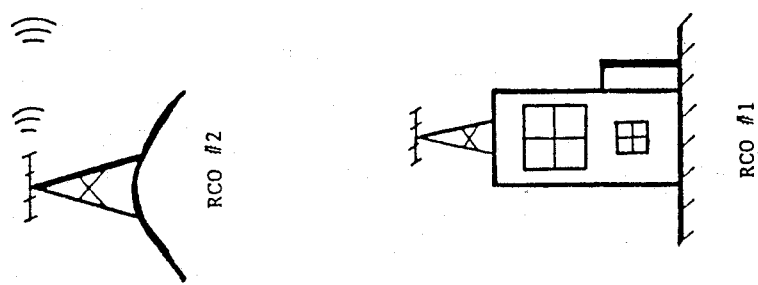
FIG. 20

INTERACTIVE TELEVISION AND DATA TRANSMISSION SYSTEM

BACKGROUND OF THE INVENTION

This invention relates to a new system referred to as "T-NET" which provides bidirectional communication of digital information to a plurality of fixed or mobile subscribers on a vacant TV channel adjacent to, and cooperating with an existing "Host" television (TV) station. The horizontal and vertical sync pulses of the host TV signal are used as a wide-area clock to coordinate time and frequency division multiplexing of subscriber transponders and to trigger up-link responses from them only during the horizontal blanking interval (HBI) to prevent interference to television viewers Down-link signals to subscribers are also sent within the HBI. In a preferred embodiment the typical subscriber-to-central receiver data rate is 300 or 1200 baud and that signal's spectrum is "spread" into subchannels 187.5 KHz wide by virtue of modulating it on a stream of 5 microsecond pulses. Thirty-two of these subchannels fit in a standard 6 MHz TV channel More than 300 transponders can operate simultaneously on each subchannel. The same subchannels may be used for up-link and down-link communications, even simultaneously on the same subchannel.

Means to multiplex information to TV receivers on an existing TV signal during its horizontal or vertical blanking interval are in use or have been contemplated (e.g. present day "Teletext"). However, the advantage of using TV horizontal and/or vertical sync pulses to synchronize both down-link and up-link radio signals, on the same or an adjacent TV channel, so they effectively exist only within TV horizontal or vertical blanking intervals, thus are invisible to television viewers, and for the further purpose of enabling time and frequency division multiplexing of many signals, has not heretofore been discovered. The present invention teaches that technology.

A major portion of the U.S. radio spectrum has been allocated to broadcast services and more specifically to television. A substantial number of television channels are unused in most cities because of physical limitations caused by inadequate television receiver selectivity. As a consequence of this at least one vacant channel exists between assigned television stations and those channels have heretofore been unusable. As a practical matter, intermodulation interference and other considerations further limit the number of usable television channels so that substantially less than half the allocated TV channels are in use in a given area. Unusable channels are sometimes referred to as "taboo" frequencies. A principal object of the instant invention is to make practical use of this presently unusable spectrum.

Described another way, typical television receivers, particularly when operating at UHF frequencies, have relatively poor frequency selectivity consequently radio transmission in channels adjacent to a TV signal is prohibited because it would cause unacceptable interference. For example, even a low power conventional radio device which transmits one watt could easily cause unacceptable interference to adjacent channel television viewers who live within a radius of several city blocks surrounding it because its power would overwhelm the TV signal. Clearly, thousands of such conventional transmitters deployed throughout a city for the uses contemplated here would generate unacceptable interference.

Since television broadcast channels are by government regulation allocated to "mass media" use, it is implicit that such channels are not intended for low capacity private radio communications such as associated with point-to-point or land mobile radio applications. Consequently applications for the aforementioned vacant TV channels, if they could be used at all, would be expected to benefit the public en masse as contemplated in the instant invention for such uses as future home information systems, interactive television, remote shopping, banking electronic mail, reservations means, security alarm communications, and the like.

Ease of installation and simplicity of operation are important considerations for mass applications. Thus sharing of the user's existing television antenna as taught here is a important feature. Integrating this invention with a television receiver to provide interactive TV controllable from remote hand-held devices comparable to those used today for remote TV channel switching are other features taught in this specification.

An object of the present invention is to provide means to accurately partition subscribers into geographic "radio cells" within which specific subscriber transponder subchannels may be assigned and isolated from transponders in other cells. This permits re-use of subchannel frequencies in non-contiguous cells to significantly expand the number of users that can operate on one previously vacant TV channel in a given city. These desirable frequency re-use features are commonly identified today with "Cellular Radio".

The instant invention is also applicable to two-way cable TV systems (CATV) to provide improved isolation of up-link and down-link signals compared to existing methods.

A further object of the present invention is to provide improved means for locating and tracking the position of mobile or portable subscriber transponders to provide economical services sometimes referred to as automatic vehicle location or automatic vehicle monitoring (AVM).

Automatic "hand-off" of present day cellular radio telephone subscribers as they move from cell-to-cell in a city is a problem because it is based on signal amplitude measurements and these vary widely at different places and at different times. An independent means such as T-NET to locate subscribers can form the basis for an alternative hand-off method which could minimize or solve the existing problem and this constitutes another T-NET application.

Yet another application of the invention is for so-called "video conferencing" which usually comprises a dedicated TV network connecting a central office with many remote offices for such applications as over-the-air teaching, presentations by management, or even TV monitoring of banks or other businesses for security alarm purposes. Such T-NET applications would employ the down-link to send pictures (video) and the up-link could either be digital or digitized "slow-voice", all multiplexed simultaneously with the existing TV program.

It is clear that simultaneous synchronization of the T-NET system with several TV stations in a city as contemplated by the inventor could be a problem. Thus a further object of the invention is to teach an operating means wherein the horizontal sync pulses of several co-located television transmitters are locked together in time so that subscriber transponders working in cooperation with one or several such stations will always transmit within the horizontal blanking interval (HBI) of all the television signals simultaneously, thus eliminating inteference to viewers of all of them. TV transmitter co-location is a practice in many large cities (e.g. Los Angeles and New York) to establish a common antenna direction for all TV viewers.

Alternatively, it is taught that if T-NET subscribers are located in a boundary service area between television stations not co-located (e.g. between TV transmitters in adjacent cities), then those subscriber transponders can be programmed to transmit only during the vertical blanking interval (VBI, which is much longer in time duration than the HBI) and thus will not interfere with TV viewers of either city, provided those television stations are synchronized to cause their vertical blanking intervals to overlap as taught in this invention.

Two new and improved methods are also taught for sending digital information to subscribers (down-link) by either: (1) co-channel modulation of the Host TV signal in a non-interferring manner or (2) modulating new "out-of-channel" subcarrier sidebands in adjacent upper or lower (or both) TV channels.

BRIEF SUMMARY OF THE INVENTION

The invention relates to a bidirectional radio communication system for use on presently vacant TV channels in cooperation with a host television transmitter. In one embodiment the host provides down-link digital signals to a plurality of subscriber transponders using the improved methods herein set forth. Subscriber transponder devices detect these signals and transmit carefully synchronized up-link digital signals to central receiving sites which are preferably located along the path between subscribers and the host television transmitter. The inventor calls the system "T-NET".0

A network control center (NCC) interconnects the host television transmitter and central receivers with Information Providers using conventional trunk-line paths so as to furnish the Information Providers with means to communicate with their subscribers, or to provide virtual circuits for subscribers to communicate with each other. The Information Providers may be organizations such as banks, retail stores, vehicle dispatchers, Data Banks, entertainment sources such as pay TV, and the like.

The horizontal and vertical synchronizing pulses normally transmitted by the host television transmitter are employed in the invention as a clocking mechanism to coordinate time and frequency division multiplexing of subscriber receiver/transmitter devices (herein called transponders). Subscriber transponders are triggered by the host TV signal horizontal sync (hereinafter called "H-sync") pulses so that they transmit only during the horizontal blanking interval (HBI) or vertical blanking interval (VBI). The HBI is typically eleven microseconds in duration and viewers living within a radius of about one mile surrounding a transponder are simultaneously blanked out during this time period. Consequently they would not see the transponder's signal, thus will not be interfered by it, providing its transmission duration is on the order of a few microseconds The T-NET system is most easily described by comparing its operation to a radar system. The Host TV H-sync pulses are analogous to the outgoing radar pulses and these trigger transponder reply pulses ("echos"). The reply-echos, each comprising one bit of information, are received at a central receiver after a transit delay and that delay is a measure of the distance to the subscriber. In the United States the TV H-sync pulse recurrence frequency (called PRF in radar) is 15,734 Hz and provides an unambiguous radar "range" of about six miles because radio waves travel at about 10.7 microseconds (two-way) per mile and the time between H-sync pulses is 63.555 microseconds.

UP-LINK SUBSYSTEM.

A standard U.S. color TV frame consists of 525 horizontal "lines" and 29.97 frames are transmitted per second to yield 15,734 horizontal lines with H-sync pulses per second. Thus subscriber transponder up-link reply-echos could be triggered by the TV horizontal sync pulses at a rate up to 15,734 pulses per second. However, this data rate is much faster than typical transponders require because they are usually designed for a performance comparable to telephone modems (300 to 1200 bits per second). In one embodiment of the invention the transponders transmit a RF reply pulse to send a logic "1" or no pulse (no emission) for logic "0" when interrogated by a TV H-sync pulse. Consequently, if transponders are designed to transmit at 300 baud they will respond (i.e. provide an echo) on every 52nd TV H-sync pulse (15,734/300 $\dot{=}$ 52).

Several transponders could therefore be scheduled to initiate transmission on different TV "lines", that is, different H-sync pulses, and on every 52nd horizontal line thereafter (modulo 52). For example, one transponder could use the H-sync pulse of TV horizontal lines 1, 53, 105, . . . 469. Another transponder at the same location could be programmed to transmit on horizontal lines 2, 54, 106, 158, . . . 470, and so on. Thus up to 52 different subscribers living at the same range could effectively transmit on the same subchannel from one range "cell" (i.e. one range gate) location, but operating on 52 different TV H-sync lines of the 525 horizontal lines available on each TV frame. This permits each of them to send 10 bits on each TV frame, which results in about 300 baud transmission rate each.

This multiplex method is defined herein as a "coarse" time division multiplex process to distinguish it from the "fine" time division (actually space division) multiplex process that occurs because different subscribers live at different distances from the TV transmitter, thus at different transit time (range gate) intervals.

For example, a system using six range gates, each five microseconds wide, would provide an unambiguous T-NET service area radius of about six miles. Thirty-two different radio frequency subchannels could be created in one vacant 6 MHz wide TV channel. Consequently 9984 different subscribers (52 H-sync lines $\times$ 6 range cells $\times$ 32 subchannels) could simulataneously operate in one angular sector without signal "clashes" or range ambiguity. A similar number could operate in a 12, 18, or 24 mile service radius using a software routine to eliminate the "radar range ambiguity" which arises when more than one H-sync pulse is in transit at one time between the TV transmitter and the subscribers.

At the central receiving site each basic timing process commences with each TV frame. This occurs upon receipt of a vertical synchronizing (V-sync) pulse from the television station and the 525 H-sync pulses that follow it (in the U.S. standard NTSC format). In a preferred embodiment the H-sync pulses each trigger the start of a "range address generator" at each central receiver which generates a series of delayed receiver range gates, each having a width of 5 microseconds. This width is adjusted to match the width of the pulse signal transmitted from each subscriber. Five microseconds is also the approximate width of the standard TV H-sync pulses. The central receiver, which has previously stored in its memory the range to each subscriber transponder, opens up a range gate at the expected time of arrival of each transponder digital bit pulse to thereby determine if the transponder has sent a logic "1" (i.e. a transmitted pulse) or a logic "0" (no transmitted pulse). A T-NET system serving a 24 mile radius would expect a 257 microsecond maximum duration between receipt of a TV H-sync pulse and receipt of a delayed transponder reply pulse if the TV transmitter and the central receiver ar co-located.

A computer at the central receiver collects all of the time interleaved "0" and "1" responses from its many subscribers, sorts and groups them into separate packets and appends the appropriate subscriber address. One preferred packet structure which can be employed in the invention is the so-called X.25 public packet switching protocol which is expected to be universally accepted. These packets are then forwarded through conventional communication trunk lines to a centrally located network control center (NCC) where the packets are further routed by conventional means to various Information Providers such as data banks, electronic mail services, financial institutions, and the like. Their replies are similarly routed back to each subscriber as described below.

DOWN-LINK SUBSYSTEM

Present Art. In the instant invention, digital communications to transponders could be superimposed on a television signal using either conventional techniques known today (e.g. Teletext) or the enhanced new methods disclosed in this specification. In the present art, teletext digital signals are transmitted on up to 8 of the 21 TV horizontal lines that lie within the vertical blanking interval (VBI) of conventional television signal formats. One such method is called the North American Basic Teletext Specification (NABTS) and this standard permits approximately 288 bits of information to be packed in each of eight of the twenty-one horizontal lines that lie within the TV vertical blanking interval. Since the VBI repeats at the rate of 60 times a second, this results in an average down-link traffic capacity of approximately 138,000 bits per second (288 bits×8 lines×60 Hz). We refer to these methods as co-channel techniques because they lie within, and share the Host TV's channel.

New and improved means are taught in this specification for sending information down-link to subscribers at greater speeds and more reliably. These are subdivided into two classes: (1) those that operate on the adjacent upper or lower channel (or both), and (2) co-channel techniques that share the same channel as the TV Host station. The inventor's improvements are summarized in the following paragraphs.

Adjacent Channel Down-Link. A preferred embodiment of the present invention packs 4 bits of information on each of up to 32 time-gated subcarriers. These subcarriers are tuned to a channel adjacent to the Host TV station channel and are gated to exist only within its horizontal blanking interval (HBI). Since the HBI repeats at the rate of 15,734 times per second, this provides a potential capacity of approximately 2 million bits per second (15,734 Hz×4 bits×32 subchannels); a substantial improvement over existing Teletext. While this method requires use of a vacant adjacent channel above or below (or both) the host TV station, some of the same subchannels used for the T-NET up-link can be used for the down-link as well, even on the same subchannel at the same time.

Co-channel Down-Link. The second improved method to increase the digital traffic capacity of down-link data streams superimposed on the TV transmission is taught here. It uses the same channel as the TV signal (co-channel) and involves the sequential adding and subtracting of identical digital data streams to the existing video picture information at corresponding TV picture elements of sequential TV frames. The process is as follows: the existing TV video information of each horizontal line of a first frame is stored and compared to the video on the corresponding lines of the following frame to locate non-moving ("frozen") portions of each scene. The desired digital data is first added then subtracted on corresponding lines of the first and second frame, preferably at only the frozen scene portions. For example, each digital bit added to each line could be a pulse about 185 nanoseconds in duration as in existing Teletext to yeild 288 bits per line. On the following frame the same digital data is inverted and, in effect subtracted from the frozen video of the previous corresponding horizontal lines and again transmitted. The result is that at any TV picture spot (pixtel) of the television viewer's screen the digital information which is first added then subsequently subtracted, cancels and becomes invisible. Each of the 525 lines per frame could carry data in this manner. Note that each frame consists of 525 lines in two interleaved "fields" of 261.5 lines each in the U.S. Standard.

The invisibility of data is primarily due to the known psychological canceling process of human vision, but also because the phosphors of the television screen have a slight averaging effect that smoothes out TV scenes. This cancelling effect can be optimally adjusted for data added/subtracted from fixed televised scenes as well as to minimize "beat" effects caused by its presence with the color TV chroma subcarrier. However, for televised scenes that include motion there is a slight difference in the video level from one frame to the next in the motion part of each scene and therefore superimposed digital data followed by inverted data, may not completely cancel. Fortunately, if the data is transmitted at the high rate proposed here, one can capitalize on the fact that the frequency response of the human eye to this "high fidelity noise" is masked by the motion in those portions of the moving scene. In other words, the human eyes' resolution deteriorates and does not see high frequency extraneous components of a scene which is in motion and one could send data with motion scenes with some sacrifice of picture quality. Alternatively, data transmission could be inhibited in scene segments which contain motion as suggested above.

The technique of adding and subtracting digital data just described can be implemented using known digital TV scene store and forward techniques. This is rather simple on televised black and white programs. The description of how the new process works on color television transmissions is somewhat more complex, though essentially similar as will now be described.

Color television basically transmits three different signals related to the primary colors (red, green, blue) and these are generally refered to as the in-phase (I), quadrature (Q) and luminance (M) components. For reasons related to characteristics of human vision it turns out that the frequency bandwidth requirements of the luminance component "M" is substantially greater than the other two. The "I" and "Q" components are in fact superimposed on a chroma subcarrier channel having a useful information bandwidth of only one-third to one-half that employed for the luminance component. Consequently, the instant invention provides for the modulation of digital data on the luminance component only and in such a manner that the digital data manifest frequency spectra well above the spectra of "I" and "Q" components, thus invisible to them, and in such a manner that superimposed digital data followed by inverted data superimposed on corresponding locations of a following frame visually cancel substantially as described before. Thus regular TV video and piggyback data may be transmitted simultaneously on the same TV channel.

This process could be accomplished at a data rate representing the proper harmonic ratio of the horizontal sync rate to optimize visual cancellation in much the same manner used to select the proper TV chroma oscillator frequency in present day color TV receivers.

This improved method of piggyback down-link co-channel transmission is particularly attractive for such applications as video conferencing where a speaker in a central location may wish to address a large number of remotely located offices and in which he uses a series of charts and graphs; thus a large part of the TV scene comprises low data content fixed video consistent with the capability of this invention which is slower than regular TV. Most of the motion is primarily in the speaker's lips. This point-to-multipoint video conferencing mode superimposed on regular TV is yet another attractive application of the T-NET system and has the additional benefit of having a return path so that the listeners can "talk back".

Angular Sectors. One preferred embodiment of the instant invention would employ directional antennas at the central receivers, for example, each having a gain of approximately 20 dB and beamwidth of about 18 degrees at UHF. Twenty such antennas would provide a full 360 degree omni-directional coverage if all were located in one central location. Central receivers could be located near the host television transmitter or they could be dispersed throughout a city area depending upon the local topography and coverage desired. In one preferred embodiment previously described, each subscriber transponder transmits for about five microseconds when it is interrogated by every 52nd H-sync pulse. The radio frequency (RF) bandwidth required to carry such a signal is on the order of 187 KHz. Thus 32 different transponder "subchannels" could be assigned within one typical 6 MHz television channel. For example, sixteen even numbered transponder subchannels could be assigned to one directional receiving antenna sector while the adjacent antenna sectors could use the 16 odd numbered subchannels. Such a plan would permit the re-use of the even and odd numbered transponder subchannels many times within a city to significantly increase the overall system digital traffic capacity.

Vehicle Location. Because this invention operates in a manner analogous to a radar system wherein the TV horizontal sync pulses are equivalent to the radar's outgoing transmission pulse, and where the transponder pulses triggered by it comprise a reply echo, it is clear that distance to each subscriber can be accurately determined. This is used to advantage in two ways: for fixed subscribers the central receiver can accurately predict the time at which each subscriber transmission pulse will be received, consequently it can optimumly schedule subscriber responses in a space, time and frequency division manner to optimize the system traffic capacity. Alternatively, if the range to each subscriber is unknown, as for example in portable or vehicle mounted devices, then specific frequency subchannels can be dedicated to those mobile transponder applications so that one can measure the position of each vehicle and automatically keep track of its location using target acquisition and tracking techniques well known in radar. This is done simultaneously with data transmission with the vehicle.

In the illustrative system previously described, the angular bearing measurement to the unknown vehicle position would be rather crude because of the relatively wide beamwidth (i.e. 18 degrees). On the other hand, the range to transponders can be precisely measured to the order of a hundred feet or so. Consequently, a T-NET system can be optimized to provide much better vehicle location accuracy by using two separated central receivers properly programmed so each measures range to each mobile transponder and thereby more accurately determines vehicle location (about 300 feet accuracy is anticipated).

CATV Application. Yet another application of the invention lies in the area of cable television (CATV). The isolation of signals to and from subscribers in present day CATV systems has been found to be a problem, partly because of the fact that when many subscribers transmitters are connected to the television cable they each contribute undesirable noise. Since this noise is additive in present day continuous wave (CW) techniques, the cumulative noise of all two-way CATV subscribers pose a serious problem. The instant invention solves this problem in essentially the same manner as described above for over-the-air applications. The horizontal blanking interval of a cable TV program is on the order of one mile as in the examples discussed before. In the instant invention the transponders' up and down-link emissions exist only during the HBI, hence are invisible to subscribers living within a mile of each other. One embodiment of a cable TV application of this invention would install T-NET "master" (multiplexed) repeaters within CATV amplifier boxes which typically are at intervals on the order of one mile along the TV cable, and regular transponders at each subscriber's home. T-NET signals are collected at the master repeater and relayed "over-the-air" to a T-NET central receiver and processed in essentially the same manner previously discussed.

The various techniques just described comprise the essential building blocks from which various system architectures may be devised to practice this invention. For example, it is obvious each transponder could reply to all H-sync pulses to provide a 15,734 baud rate and thereby "burst" its up-link message much faster; combining this with a different time-sharing arrangement between transponders provides yet another mode of operation. It is also obvious that if the Host television station went "off the air" at night, or for whatever reason, a separate independent transmitter (perhaps owned by the T-NET operator) could be put on the air to broadcast the necessary H-sync and V-sync coordinating signals. In such instances concern for protecting viewers would be irrelevant. Thus the various applications described herein and others will become evident to the skilled communications system designer upon careful study of the operating details of these building blocks as hereinafter described.

BRIEF DESCRIPTION OF THE DRAWINGS

Further objects and advantages of the invention will become apparent from the following specifications taken in connection with the accompanying drawings, wherein like reference characters identify parts of like functions throughout the different views thereof.

FIGS. 9A-9C illustrates the gated subcarrier down-link adjacent channel embodiment.

FIG. 18 is a block diagram of the invention as applied to automatic vehicle location, including a digitized "slow voice" up-link.

FIG. 20 illustrates the application to cellular radio.

DETAILED DESCRIPTION OF THE INVENTION

Reference now should be made to the drawings in which the same reference numbers are used throughout the various figures to designate the same or similar components.

Figure 1:
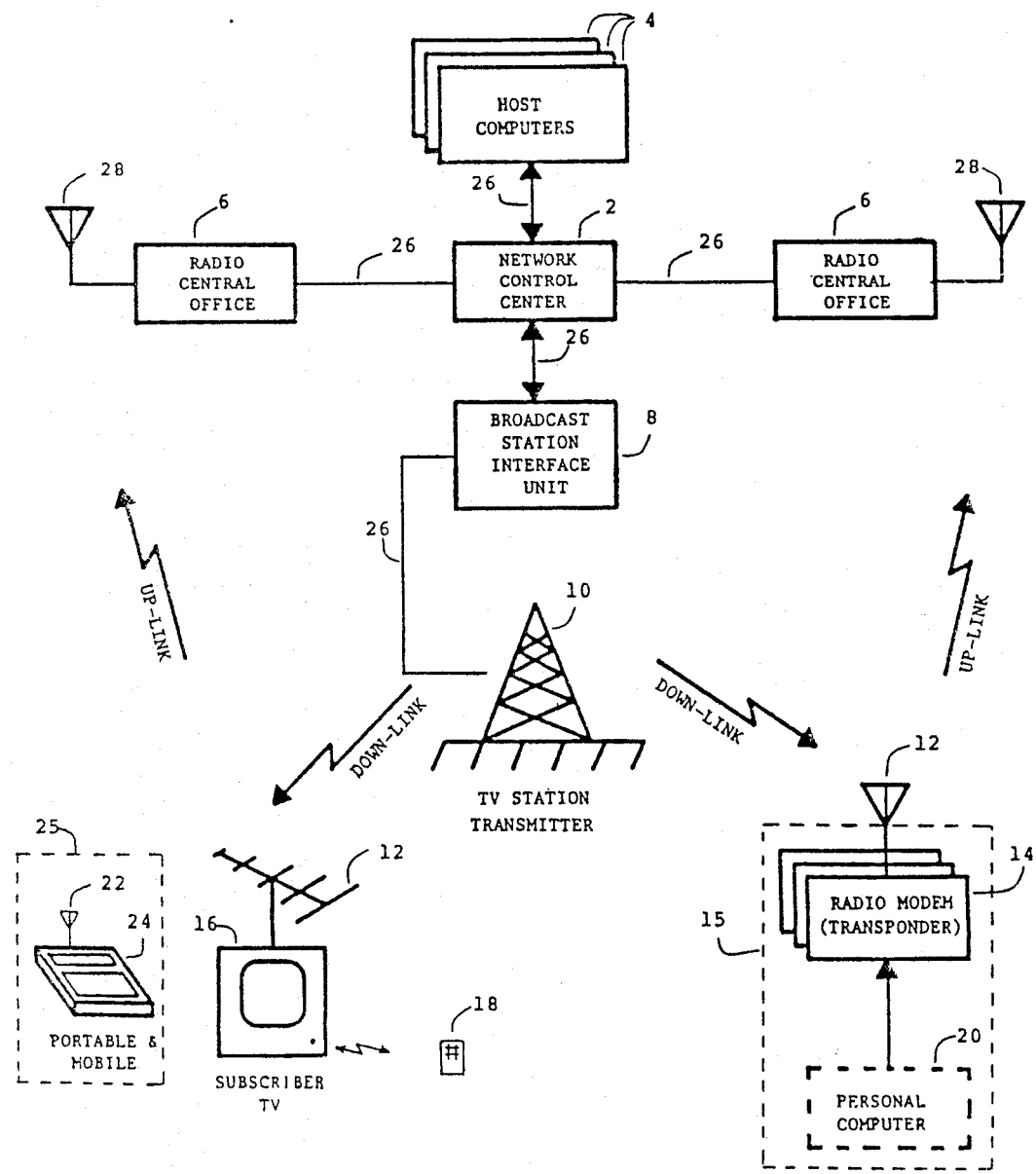
FIG. 1 is a block diagram of the overall T-NET system configuration.

FIG. 1 illustrates the major components of an entire system of the invention for three applications serving a large number of: mobile transponders, radio modems used in conjunction with personal computers (PC), and two-way interactive television viewers having remote hand-held control means. The system of FIG. 1 is intended to provide communications facilities for a plurality of host computers 4 who provide information to subscribers, or so that one or more Hosts, acting as switch centers, may establish what are sometimes called virtual circuits that enable subscribers to communicate with each other. The principal device used by subcribers to communicate on the system of this invention comprise receiver-transmitter devices usually referred to herein as "transponders" but sometimes called "radio modem" or "RF modems" when used with personal computers.

Referring to FIG. 1, the network control center 2 employs conventional computer hardware, software and trunk lines 26 to receive, temporarily store, route, and forward digital messages between the host computers 4, the broadcast station interface unit 8, and radio central offices 6. For example, a subcriber at a fixed location 15 sitting at personal computer 20 may communicate digital information packets through radio modem 14 via radio signals transmitted through antenna 12 to a centrally located antenna 28 and radio central office 6 which detects and reformats these message into standard packets and forwards them to network control center 2. The network control center reads the destination address portion of these packets and forwards them to the appropriate host computer 4, which is one of a plurality of hosts. If a reply is required, the host computer 4 generates the reply message and sends it to the network control center 2 where it is reformatted and placed into a transmission queue where, at the appropriate time, broadcast station interface unit 8 transmits it over TV transmitter station 10 where the message is radiated over the air and detected by antenna 12, demodulated by radio modem 14 and sent to personal computer 20 to complete the message loop.

The transponder device is functionally the same whether it is incorporated within a plurality of mobile subscriber packages 25, radio modems 14, or integrated in interactive televisions 16. Device 25 could be a portable computer terminal or simply a "Two-Way Pager" which has the added benefit of being able to acknowledge "beeps", or even send and receive alpha-numeric messages. If the subscriber transponder is integrated within television 16 then it may be conveniently operated through a remote hand-held device 18, which could communicate with television 16 using conventional wireless techniques, such as infrared signalling, thus providing "Interactive TV". The antennas 28 employed with radio central offices 6 may be directional in design so that each receives only from a specified direction and thereby partitions the service area into pie shaped sectors. The communication paths 26 connecting the various components of the common central equipment comprise conventional communication trunk lines such as microwave links, dedicated phone lines, or other suitable means.

Figure 2:
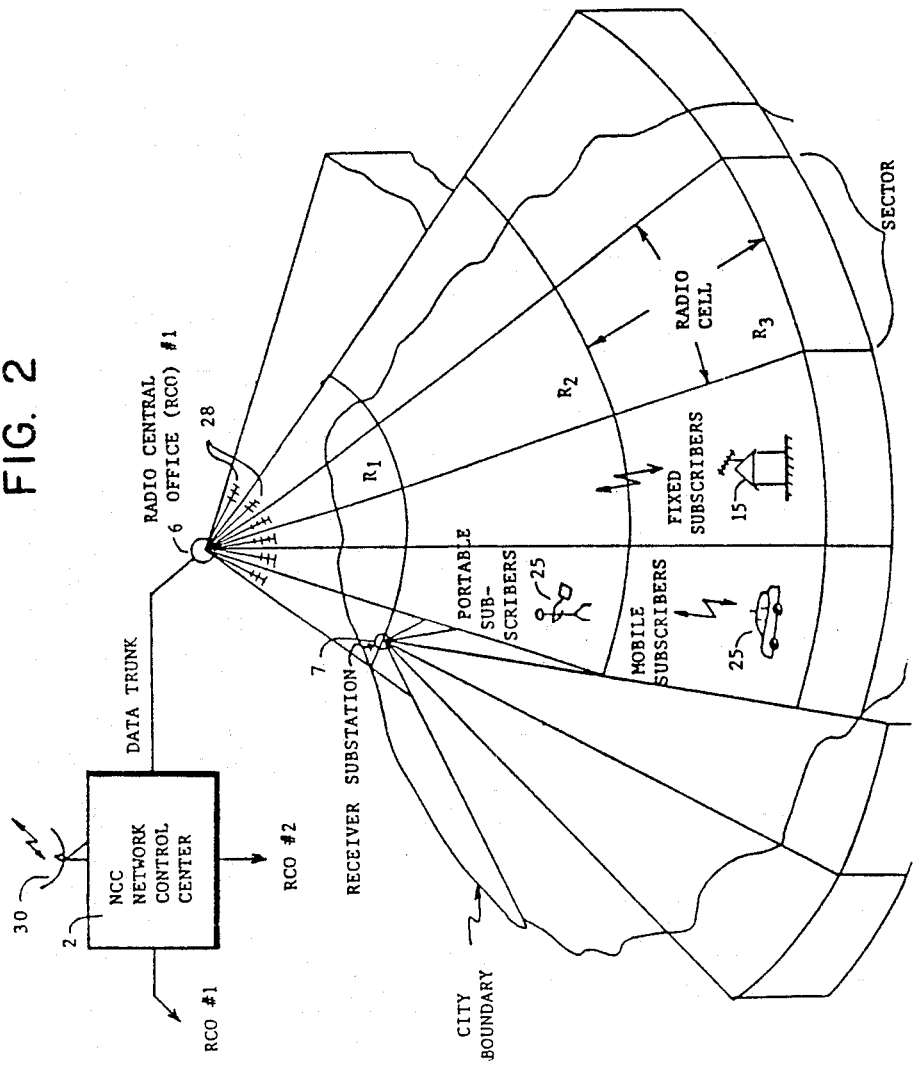
FIG. 2 is a pictorial of the invention employing directional antennas to segment the service area into pie shaped sectors covering a city area and illustrating possible locations for a receiver substation.

FIG. 2 is a pictorial illustration of the invention using a plurality of directional antennas to cover a city area from a radio central office 6 and a receiver substation 7, which substation is essentially the same as 6 but displaced from it so as to extend coverage into areas that may not be accessable to radio central office 6 because of mountains or other obstructions. FIG. 2 also illustrates the definition of a radio cell which, for purposes of this specification, is considered to comprise a geographic area defined by the beamwidth of each antenna 28 and a range gate interval such as the distance between R2 and R3. It will be pointed out in subsequent discussion that the distance between R2 and R3 is proportional to the propagation distance covered during the subscriber transponders pulse-width which is on the order of five microseconds in a preferred embodiment. Consequently the distance between R2 and R3 is on the order of a mile.

FIG. 2 also illustrates how network control center 2 may be provided with intercity communication means through use of satellite commnication link 30. Messages may be communicated between cities by these and other well known methods.

Figure 3:
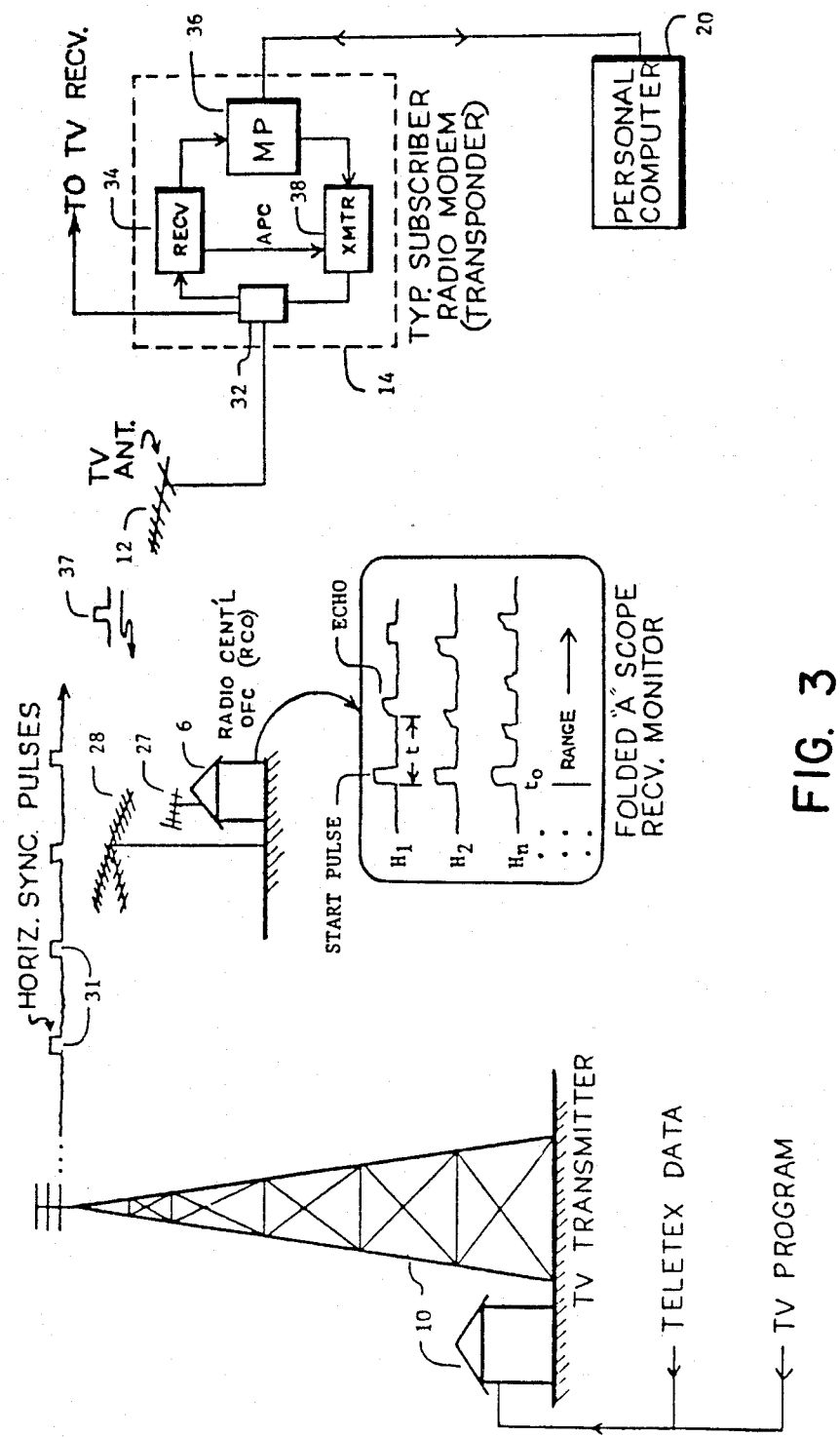
FIG. 3 is block diagram and pictorial illustrating the manner in which TV horizontal sync pulses trigger subscriber transponder replies and a pictorial illustrating the appearance of the TV sync pulses followed by range delayed subscriber replies, as in a radar "A" scope.

FIG. 3 is intended to facilitate the explanation of essential features of the invention. For purposes of illustration, operation of the invention is considered analogous to the operation of a radar system. A radar system typically transmits brief radio pulses which impinge on "targets" in its transmission path that reflect back pulse energy (called the echo in radar) that is detected at a receiving point after an elapsed time t. The elapsed time t is proportional to the pulse propagation distance to and from the reflecting targets and consequently distance to targets (subscribers) may be determined by measuring t. When directional antennas are employed to either send or receive signals (or both) then the direction to the target may also be determined.

Referring to FIG. 3, TV transmitter 10 radiates a conventional television signal including horizontal sync pulses 31 and digital data which are detected by the transponder antenna 12 and sent through antenna duplexer 32 to the receiver 34. Receiver 34 locks on to the TV signal and extracts from it the horizontal and vertical synchronizing pulses which are subsequently employed to detect the T-NET digital down-link signals that are synchronized to and accompany the TV signal and also to coordinate the radio modem's reply pulse transmission time slots so reply pulses exist only in the HBI. The digital information and synchronizing pulses are connected to microprocessor 36 where the address portion of the message packet is examined to determine if it is a signal intended for that specific subscriber. If it is, it is forwarded to the companion personal computer 20. The link between microprocessor 36 and computer 20 could employ the well known RS-232 standard. Computer 20 digests that information and if a reply is necessary it will generate it and transmit it back to microprocessor 36 where it is temporarily buffer-stored and prepared for transmission at appropriate time slots using transmitter 38. Transmitter 38 generates an RF pulse in synchronization with the horizontal sync signal time slot received from microprocessor 36 and transmits that pulse through duplexer 32 and antenna 12 back to the central receiver antenna 28. Antenna 28 may be one of a multiplicity of directional antennas to provide the desired city coverage. Antenna 28 is connected to the radio central office 6 where the up-link information is detected, reformatted, and sent to the network control center 2 illustrated in FIG. 1. Another antenna 27 at the radio central office detects sync signals from television station 10 and connects them to the radio central office where they are employed to initiate the desired timing processes based on the TV signal's horizontal and vertical synchronizing pulses.

Referring again to FIG. 3, the "folded A scope" receiver monitor shown in the center of the illustration is intended to facilitate the description of the T-NET system operation in analogy to a radar system. "A" scopes are commonly used in radar to display range to various targets. In these examples the trace is "folded" into many lines. The "A" scope monitor shows a series of horizontal line sweeps (like a TV raster scan) each of which starts when it is triggered by the horizontal sync pulse transmitted by TV station 10. This is called the start pulse in that illustration and a short time later an echo pulse from a subscriber appears; the time duration t between the start pulse and the echo is indicative of the range to that subscriber.

The first line of the folded "A" scope is called H1, the second H2, and so on through H52 for a modulo 52 system. Since each line is triggered by H-sync pulses from TV station 10, each line has a duration of 63.555 microseconds in the U.S. TV standard. The length of each line thus corresponds to a distance of about 6 miles. This folded "A" scope monitor may also be viewed as equivalent to a TV screen rastor scan which sweeps out 52 lines then repeats itself.

In radar jargon each horizontal line is called a "A" scan but in this illustration, having many horizontal sweeps, we refer to it as a folded "A" scope. The folded A scope monitor shown in FIG. 3 could be employed within a radio central office 6 for the purpose of monitoring the radio signal activity, or perhaps for technical evaluation or trouble shooting and to show at a glance the strength of, and range to, various subscribers. In actual practice the detection, storing, and routing of signals is all done automatically by computers and such a display would not be required for those functions.

Figure 4:
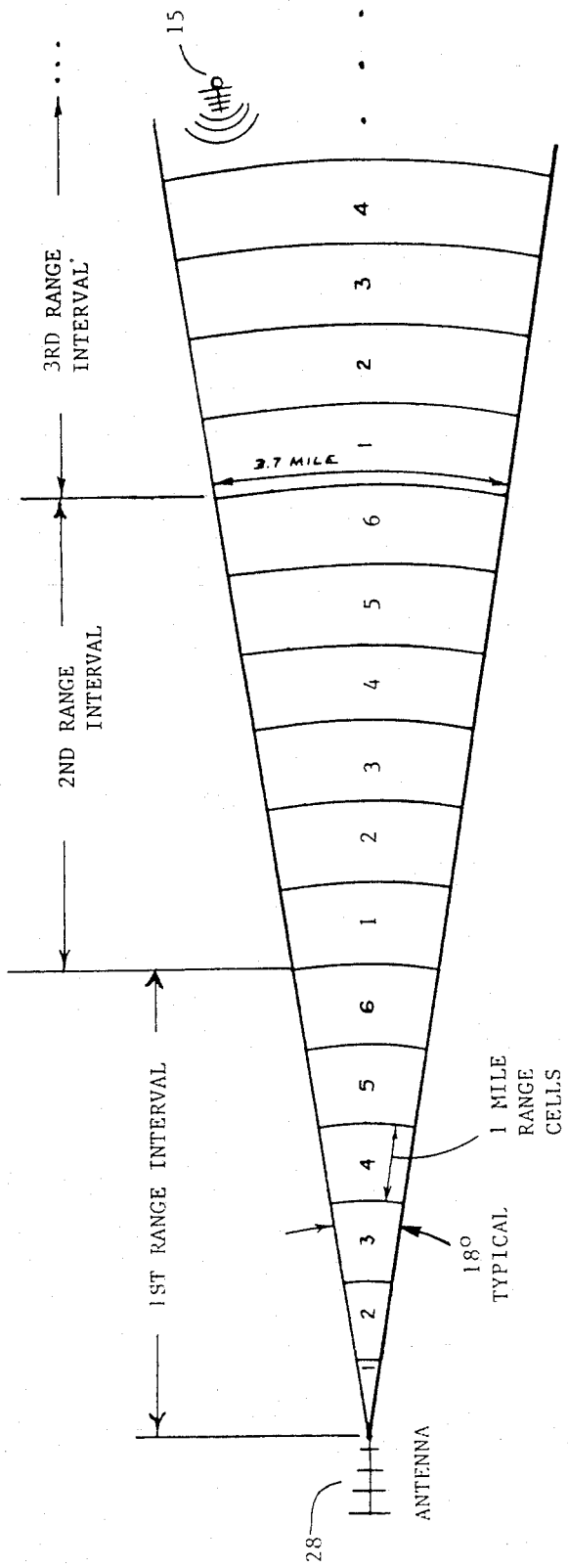
FIG. 4 is a plan view of one central receiver directional antenna coverage sector segmented into range cells.

FIG. 4 is a top view of one angular sector of a radio central office service area. Antenna 28 provides reception of signals in an angular sector approximately 18 degrees in width and that sector is further partitioned into range cells numbered from 1 through 6 in the first range interval, and similarly in the second and third range interval. Each of these range cells is one mile in length and this corresponds to a time duration of 5 microseconds, which duration is also the width of each transponder reply pulse.

It was pointed out earlier in this specification that the unambiguous range of the T-NET system is proportional to the time duration between TV horizontal sync pulses and this turns out to be 63.555 microseconds, about 6 miles. This is called the first range interval. The second range interval, also numbered 1 through 6 extends from 6 to 12 miles and the third range interval extends from 12 to 18 miles. Obviously, the number of range intervals required depends on the size of the city.

Since each TV signal horizontal sync pulse is numbered from 1 to 525 starting from the first vertical sync pulse which defines a TV frame, it is clear that the central receiver 6 as well as each subscriber transponder, is each capable of unambiguously counting and keeping track of all 525 horizontal sync pulse numbers. Consequently it is clear that a software algorithm can be devised to remove any ambiguity that might exist as to whether a subscriber lives in range interval 1, 2, 3, etc., and which specific H-sync pulse they have been assigned to reply on.

It was also pointed out earlier that about 10,000 subscribers could operate simultaneously at 300 baud each within one six-mile range interval. That maximum number of subscribers would remain the same even though more range intervals might be employed to yield a 12, 18, or 24 miles service area. The number of subscribers could be increased, however, by using more angular sectors or more subchannels. For example, if 18 degree beamwidth antennas are used to cover a 360 degree area, then a total of 20 antennas would result and this would service close to 200,000 subscribers simultaneously. However, in a practical world the subscribers are not uniformly distributed throughout a service area because of terrain and service boundaries, therefore less than the optimum number of subscribers could be serviced simultaneously in a practical system. Obviously a much greater number could be served on a time-shared basis because each subscriber typically use the system only momentarily for a few minutes per day.

Figure 5:
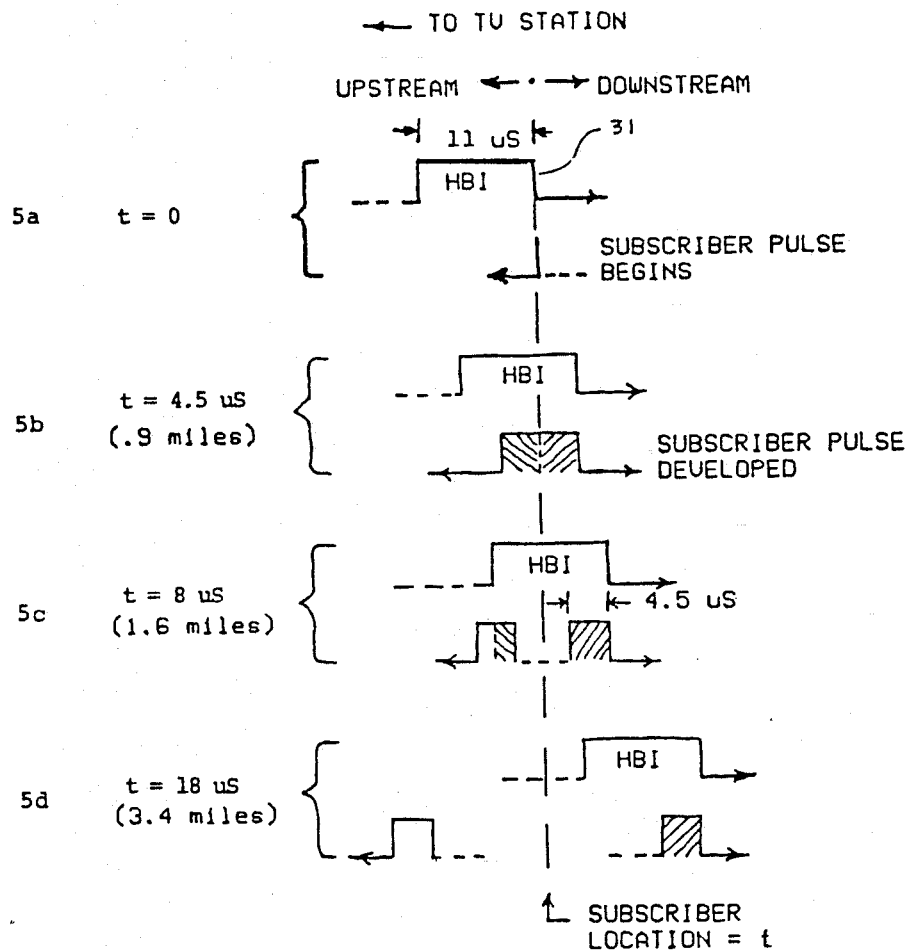
FIG. 5 illustrates the manner in which the television horizontal blanking interval (HBI) is superimposed on, and thus masks the subscriber transponder pulse transmissions.

FIG. 5 illustrates in a series of microsecond time-steps the manner in which subscriber transponder pulses are masked (i.e. rendered invisible to TV viewers) by the horizontal blanking interval of the Host television signal. The television station is assumed to be at the left side of FIG. 5 and its signal is assumed to propagate from left to right. When the Host television signal H-sync pulse impinges on the subscriber's television antenna, it triggers the generation of a transponder reply pulse (echo); the leading edge of this reply pulse is illustrated in FIG. 5a as a straight vertical line beginning at the leading edge of the 11 microsecond square pulse labeled "HBI". All this occurs at initial time t.

FIG. 5b illustrates the almost fully developed reply pulse at a time t+4.5 microseconds. The subscriber's reply pulse is shown in diagonally shaded lines (so long as it is under the HBI pulse) and it is seen propagating both to the left and to the right, upstream and downstream, respectively. Since radio waves travel at approximately a thousand feet per microsecond, the subscriber's reply pulse would have propagated approximately 0.9 miles within 4.5 microseconds and, if this illustration was seen from the top view, one would see that the subscriber's reply pulse would represent a circle 1.8 miles in diameter centered on the subscriber's antenna. The square pulse labeled HBI above the shaded subscriber's pulse is the Host TV horizontal blanking interval and it is seen to propagate to the right at the same speed as the subscriber's pulse and all of the energy of the subscriber's pulse traveling that direction is seen to exist within the horizontal blanking interval. It will always do this in the downstream direction.

FIG. 5c illustrates the time waveforms as they exist at t+8 microseconds. Since the subscriber's pulse is only 5 microseconds wide it is seen that the subscriber's transponder has ceased transmitting and the reply pulse trailing edge has left the subscriber's antenna and is now propagating in all directions. If this illustration were viewed from the top, the reply pulse would appear as a doughnut with an outside diameter of about 3.2 miles and an inner diameter (hole) slightly over 1 mile in diameter, all centered on the subscriber's antenna. Note the important point that waves propagating to the right (downstream) still exist underneath the horizontal blanking interval of the Host TV signal but the waves traveling to the left (upstream toward the TV station) are no longer masked by the HBI; in other words, TV viewers who live upstream more than about 1.2 miles from the subscriber are not simultaneously blanked-out and they could, if the subscriber's signal was strong enough, see the subscriber's response pulses. We will point out shortly that the subscriber's pulse is quite weak by the time it reaches that distance.

FIG. 5d shows the waveforms which exist at t+18 microseconds at which point the subscriber's pulse waveform which propagates downstream, shown in cross-hatched shading, still remains under the HBI and is thus masked, but the pulse propagating upstream (to the left) shown without cross hatching, is about 3.4 miles upstream and, since it is out of the HBI, could be seen by TV viewers, if it were strong enough.

Figure 6:
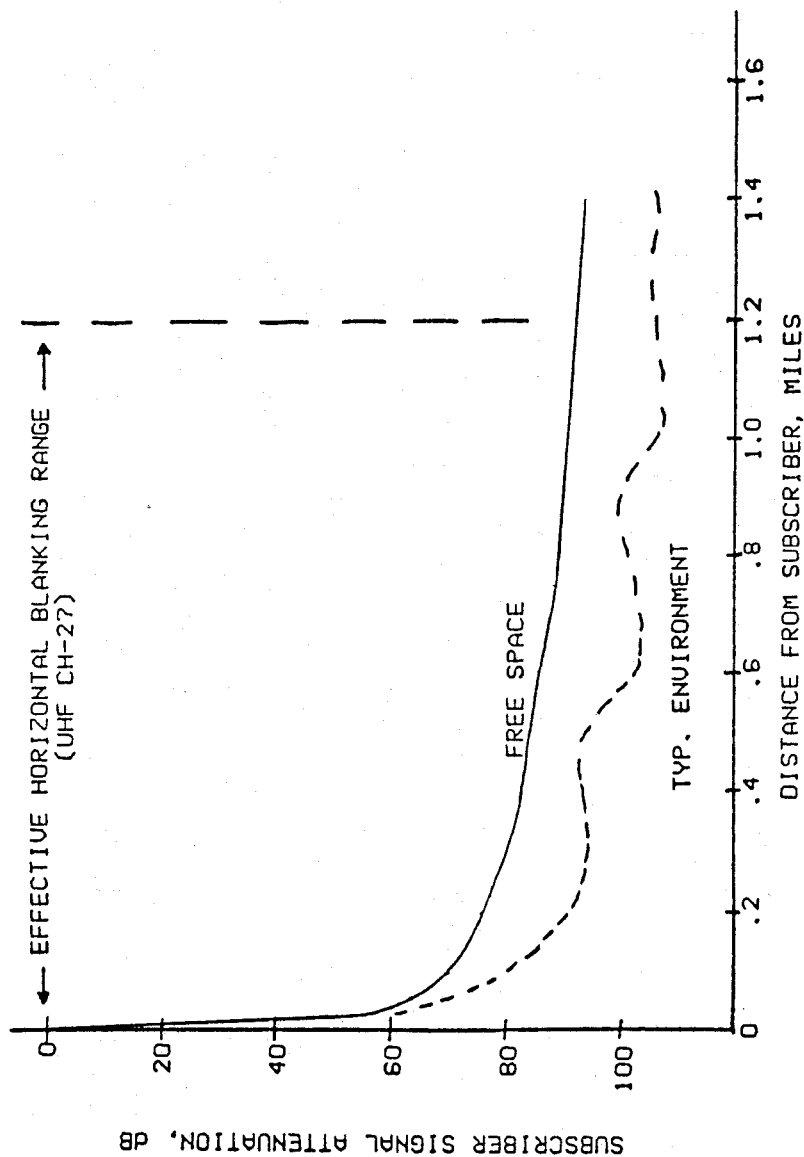
FIG. 6 is a graph illustrating the rapid drop-off (attenuation) in the strength of the subscriber transponder signal pulse with propagation distance.

FIG. 6 shows graphically a plot of the signal strength of the subscriber transmission pulses as a function of distance from the subscriber. It is well known in radio wave propagation theory that in free space the electric field intensity of a propagating radio wave falls linearly in proportion to the propagation distance. The power in that wave falls as the square of the distance and is plotted in FIG. 6; the radio wave power drops very rapidly in the first few hundred feet after leaving the radiating antenna and more slowly thereafter. By the time the radio waves reach a distance of approximately 500 feet they have fallen in magnitude by about 70 dB. The point of FIG. 6 is to show that the strength of subscriber's transmitting pulses drop so rapidly in the first few hundred feet to a level which becomes insignificant in comparison to the strength of TV radio waves and thus would not interfere with television signals.

Consequently television viewers watching programs sent by the Host television station must be protected only if they live within a few hundred feet of the subscriber's transponder antenna because this is where the transponder signal is strong and potentially capable of interfering with the television program. Fortunately, as shown in FIG. 5 illustrations, television viewers living within a few hundred feet of the transponder are simultaneously blanked out by the horizontal blanking interval of the Host television signal and consequently even though the subscriber's transponder signal is relatively strong and potentially capable of interfering with adjacent channel television viewers, all those viewers' television receivers are blanked out and cannot see any video program at that instant.

By the time the subscriber's signal propagates to a distance outside the horizontal blanking interval it is about 90 dB weaker (i.e. about 1 billion times weaker) and will not interfere with the Host television's signal. Furthermore, since the subscriber's transponder operates on a channel adjacent to the Host television signal, it is suppressed further by radio frequency filters which are tuned to the Host television signal rather than the transponders signal and this suppression typically amounts to 35 dB or more. In other words, a television receiver suppresses adjacent channel signals by about 35 dB or more. The combined effect of the signal propagation attenuation shown in FIG. 6 and the attenuation due to the television receivers tuned circuits total over 115 dB. Therefore, for all practical purposes the subscriber's transponder signal cannot interfere with television viewers tuned to the Host television signal.

In a practical environment (not "free space" as plotted in FIG. 6) the subscriber's transponder pulse attenuates even more rapidly and so the signal attenuation is even greater than 115 dB. TV viewers tuned to channels further away than the first adjacent channel suppress transponder pulses 50 dB or more because of their tuned circuits and they too are uneffected as has been demonstrated in many field trials.

Figure 7:
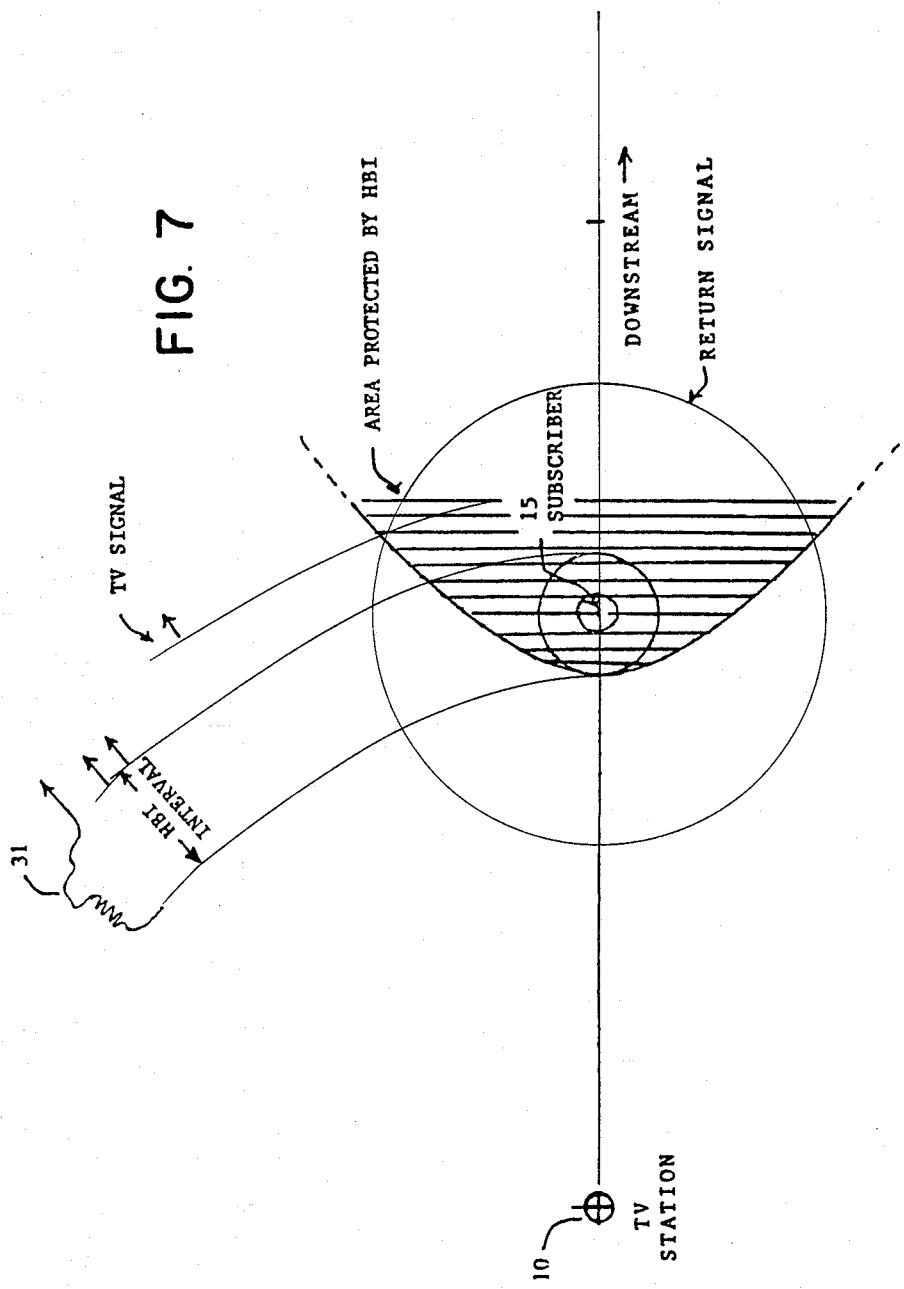
FIG. 7 is a top view of one typical communication path between TV station and subscriber transponder, illustrating the area blacked out during the HBI.

FIG. 7 is a top view illustrating the HBI masking geometry and it corresponds to the side view shown in FIG. 5. The horizontal blanking pulse 31 is shown propagating outward as a circular wave centered on TV station 10. The cross-hatched area shown around subscriber 15 is the area which is masked by the Host TV horizontal blanking interval (HBI) and all television viewers living within that cross-hatched area would not be able to see the subscriber's transponder pulses because the screen of their television receiver is blanked out by the HBI at that moment. On the other hand, television viewers living to the left of the subscriber in the area which is not cross-hatched would not be protected by the HBI masking but would, on the other hand, be protected by the very low subscriber signal strength which has already been discussed in relation to FIG. 6.

We have thus shown that transmissions from subscriber transponders would not cause interference to television viewers looking at the Host television signal because they are either blanked out by its horizontal blanking interval if they live close to the subscriber, or they are too weak to interfere with the TV signal if they live outside the horizontal blanking interval since they would then be at least a mile away.

There is another potential concern however and that is the question of whether the subscriber's transponder signal may somehow interfere with certain television receiver functions which must be accomplished during the horizontal blanking interval. We shall now address that point.

Figure 8:
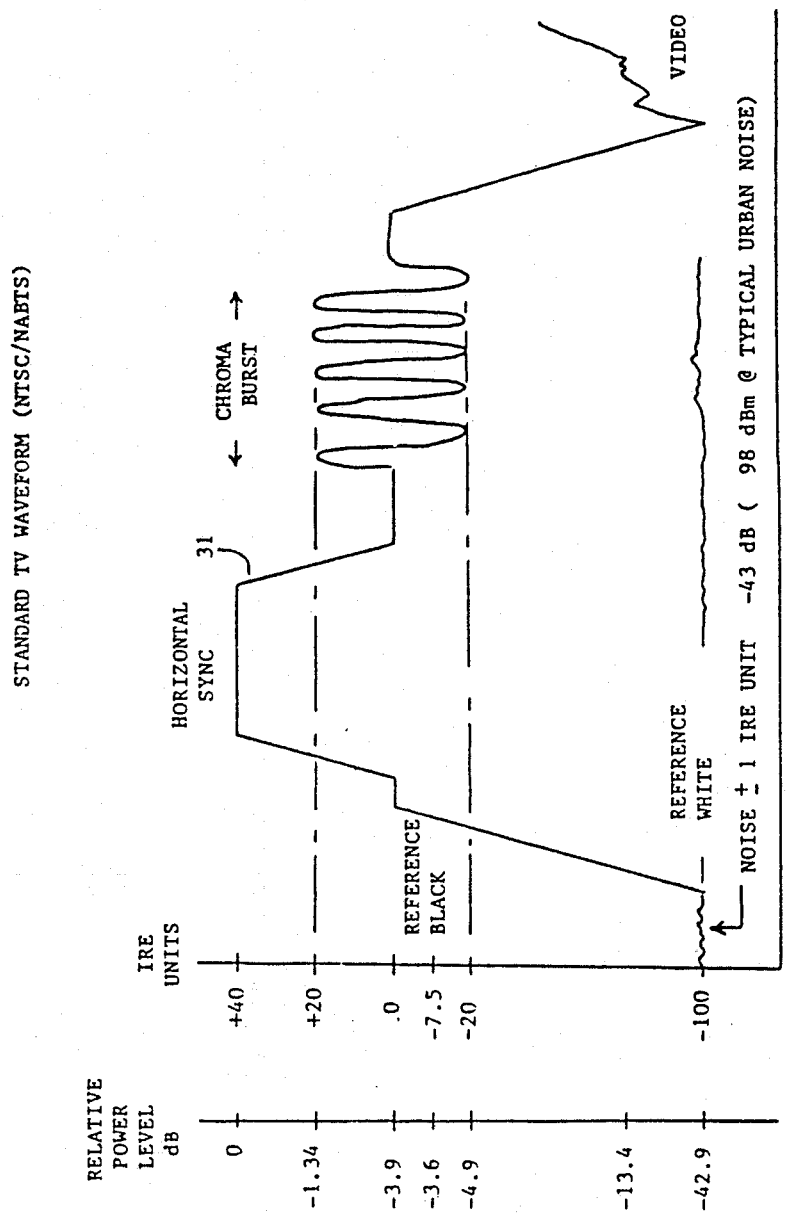
FIG. 8 is another graph illustrating the typical signal levels found in the HBI of a standard television waveform.

FIG. 8 shows a standard television waveform defined by the NTSC (National Television Standard Committee) during the horizontal blanking interval. Time is assumed to start at the left and increases to the right. Thus the first feature one sees after the start of the HEI is the front porch just preceding the horizontal sync pulse. That front porch is used to define a reference for the so-called black level; signals weaker than that level lie within the visible range of the TV screen and signals stronger than that level are black and cannot be seen. Thus the horizontal sync pulse, which is stronger than that reference level, cannot be seen. Since the subscriber's transponder commences transmission with the beginning of the horizontal sync pulse it is clear that it cannot interfere with the use of that reference black level because it exists prior to the beginning of the horizontal sync pulse. The TV horizontal sync pulse itself triggers the subscriber's transponder as well as all of the circuits needed by television receivers at the subscriber's home or in its neighborhood. Thus a subscriber transponder signal occuring at this point would only appear like a regular horizontal sync pulse and it does not intefere with the proper horizontal sync of any television receivers in its vicinity.

Following the horizontal sync pulse (FIG. 8) a "chroma-burst" waveform is transmitted on the back porch in the case of color TV signals. That chroma-burst represents approximately 8 cycles of a chroma subcarrier oscillator operating at a frequency of about 3.57 MHz and its purpose is to synchronize crystal-controlled oscillator within each television receiver which is used to demodulate the color signals. Interference with that process could cause degradation in the color balance of color TV programs. Television receivers universally employ a crystal-controlled chroma oscillator tightly locked to that chroma-burst and this acts as a very sharply tuned filter. The filter is in fact so narrow in bandwidth that the broadband energy density of the subscriber's transponder pulse used in this invention has minimal effect upon it. In other words, the spectral power density (watts per hertz) represented by the subscriber's transponder pulses as used in this invention is of such low value that the very small amount of energy which does exist within the very narrow TV chroma bandpass filter of television receivers is insufficient to interfere with it. Numerous experiments conducted by the inventor have shown that the transmissions contemplated in this specification have no effect on the color quality of television programs, even if transponders and TV receivers share the same antenna.

We have thus shown why transmissions by subscriber transponders designed in the manner set forth herein will have no deleterious effect on television viewers in the neighborhood of the subscriber or elsewhere, even if they share the same antenna as the subscriber's own television receiver.

One may question, however, how weak the signal must be in order to not interfere with television signals. Those issues and related specifications are determined by the Federal Communications Commission in the United States and by similar agencies in other countries. At the present time, the FCC has stipulated that an adjacent channel signal must be equal to, or weaker than, a television signal so as not to interfere with it. Stated another way, the only protection afforded to that television signal is the protection provided by the TV receiver tuned filters which, as stated before, represents about a 35 dB or more adjacent channel suppression. On the other hand, if a potentially interfering signal lies within the same channel as the television signal, then it must be weaker than the television signal by at least 50 dB under existing FCC rules and only 40 dB under proposed new rules. Using existing FCC rules as a criteria, the inventor has found that a subscriber transponder may use a pulse power of approximately 2 watts peak and average power of a few milliwatts to meet the FCC criteria and this is also sufficient to provide a useable signal to a T-NET radio central office at distance exceeding 20 miles. Battery operated transponders appear practical because of the low average power of these subscriber transponders.

Thus far we have described the operation of the up-link from subscriber to radio central office. We have pointed out why subscriber transmissions do not interfere with television viewers. We have also pointed out how the horizontal and vertical synchronizing pulses of the Host television signal coordinate the subscriber transponder transmissions and permit many subscribers to be multiplexed on different horizontal lines of the TV frame. We shall now describe the theory and specific advantages of the new and improved down-link from the Host TV station to subscribers.

FIG. 9a shows the spectrum of the Host television signal and the 32 new down-link subcarriers of this invention. In this illustration, they are shown to exist in the Host TV station's lower adjacent channel. It is well known that television signals employ what is referred to as upper single sideband (SSB) modulation with a small vestigial lower sideband. The Host television signal carrier frequency Fc is shown at the left side of the TV 6 MHz signal channel and most of the video energy is shown in the upper sideband. That signal energy comprises the video picture information, a frequency modulated audio carrier at 4.5 MHz above Fc and a color subcarrier at 3.57 MHz. There are also additional subsidiary carriers (SCA's) which could exist within the TV channel for the purpose of providing stereophonic sound transmission and second audio programs but they are not shown in FIG. 9A. The lower edge of the TV channel is 1.25 MHz below the video carrier Fc. Frequencies lower than 1.25 below Fc are considered to be in the next TV channel, which is referred to as the lower adjacent channel. As noted before, this has always been vacant. It is in this lower adjacent channel where the 32 subcarriers of the instant invention are positioned (they could also use upper adjacent channel). The bandwidth of each of these 32 subcarriers is approximately 187.5 KHz and each of them is wide enough to carry independent up-link pulse signals from subscriber transponders as well as separate down-link signals to subscribers as will now be described.

FIG. 9b illustrates how 4 digital bits can be modulated within the time interval of a horizontal blanking interval which is approximately 11 microseconds long (about 2.8 microseconds per bit). Each of the subcarriers shown in FIG. 9b are gated so that they exist only during the HBI and consequently they will not interfere with the video portion of the Host television program. Within this HBI interval 4 bits of information are modulated on each subcarrier. There are various modulation methods which may be employed to accomplish this. One preferred method is a phase modulation technique wherein the phase of the gated subcarrier is advanced 90 degrees and brought back to its starting phase within 1 bit interval when ever a logic "1" is to be transmitted. If more logic "1's" are to be sent in succesSiOn, the phase direction is reversed after each "1" bit; that is the wave is advanced 90 degrees and brought back to a starting phase within 1 bit interval and then retarded 90 degrees and brought back to its starting phase within the 2nd bit interval. This is done in a sine wave fashion so as to restrain the signal spectrum as much as possible to keep most of its energy within its assigned subchannel bandwidth. If a logic "0" is to be sent no phase advance or retardation will occur. This process is shown in FIG. 9b which illustrates a 4 bit sequence as 1011. Since 4 bits are transmitted during each HBI for each subcarrier, and since the HBI's occur at 15,734 Hz, this results in a down-link data rate of 62,936 bps per subchannel. Each subchannel could carry information independently.

Quadrature Amplitude Modulation (QAM). An alternative modulation method is disclosed in FIG. 9c which splits each subcarrier into quadrature components and each of these components is independently modulated to provide a more narrow transmitted spectrum and thereby minimizes interference to adjacent subchannel signals. It will be clear to those skilled in the art that said quadrature method could employ either binary (on-off) modulation of each quadrature term, or each term could take on multiple values (e.g. quadrature amplitude modulation: QAM) to define multiple symbols for greater data rates per assigned subchannel.

Two different equipment arrangements for transmitting the down-link subcarriers will now be described.

Figure 9C:
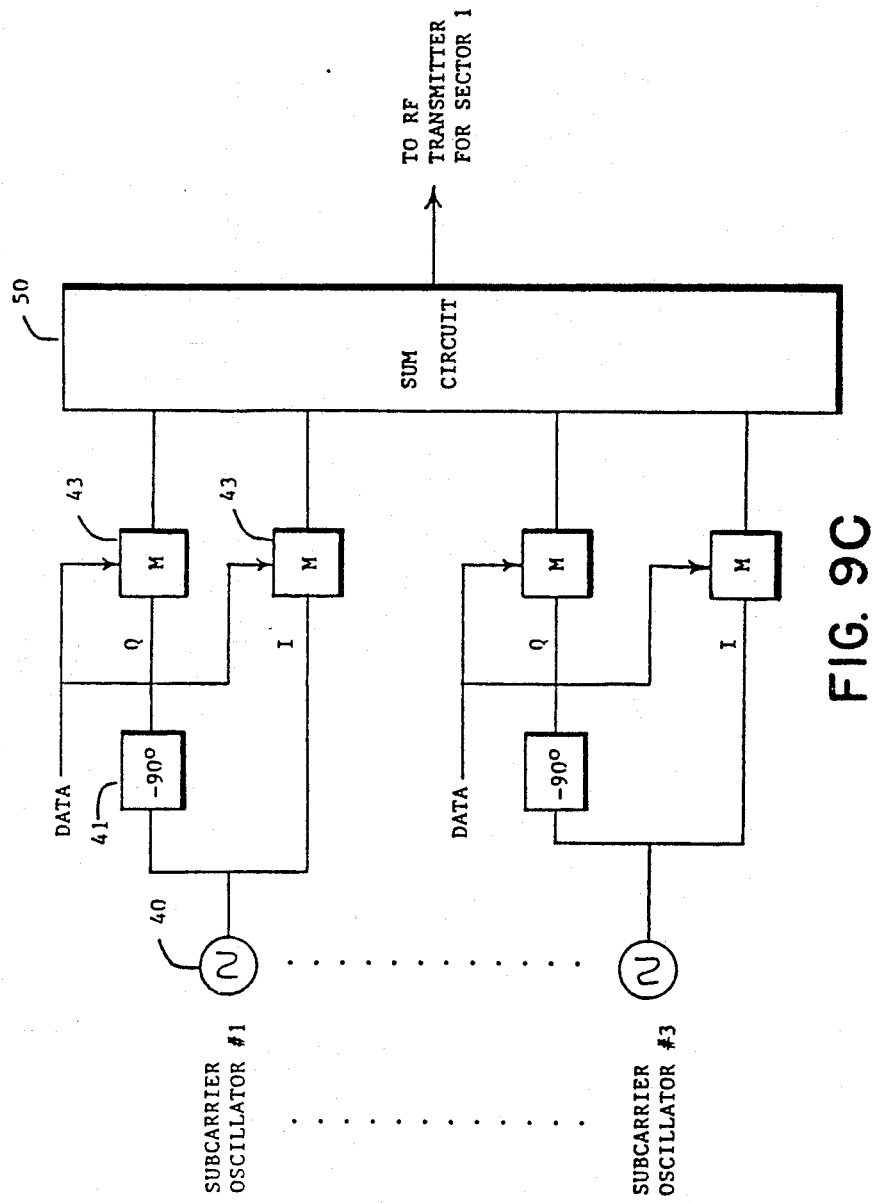
Figure 10A:
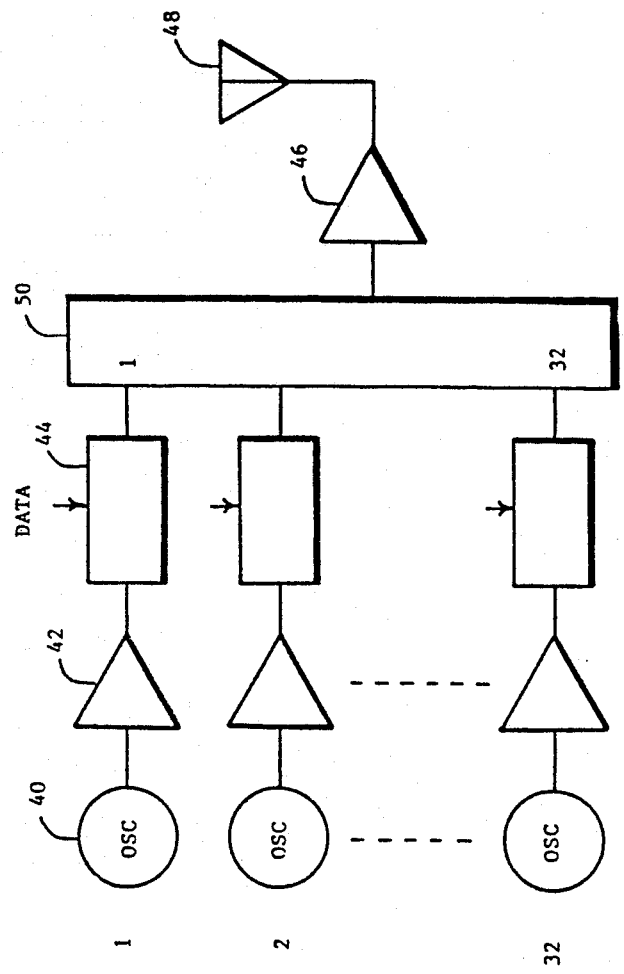
FIGS. 10A-10C illustrates two methods of modulation which can be employed in gated subcarrier down-links.

FIG. 10a shows one method in which a subcarrier oscillator 40 followed by a frequency multiplier 42 generates the desired subcarrier radio frequency which is modulated by data in 44, amplified in 46 and radiated by antenna 48. This is one of thirty-two subcarriers tuned to exist within the lower TV adjacent channel as shown in FIG. 9a. Those subcarriers are also gated to exist for only 11 microseconds in the HBI. FIG. 10a shows an assembly of thirty-two such subcarriers generators. The output of all these subcarriers can be summed together in 50 and amplified by amplifier 46 and radiated through antenna 48. Antenna 48 and indeed the entire assembly of FIG. 10a, could be independent and distinct from the Host television transmitter/antenna. This particular method has the advantage that antenna 48 could be a directional antenna. Several subcarrier assemblies, each identical to FIG. 10a, and their associated antennas 48 could be provided to generate down-link transmissions into other angular sectors to thereby cover an entire city.

Figure 10B:
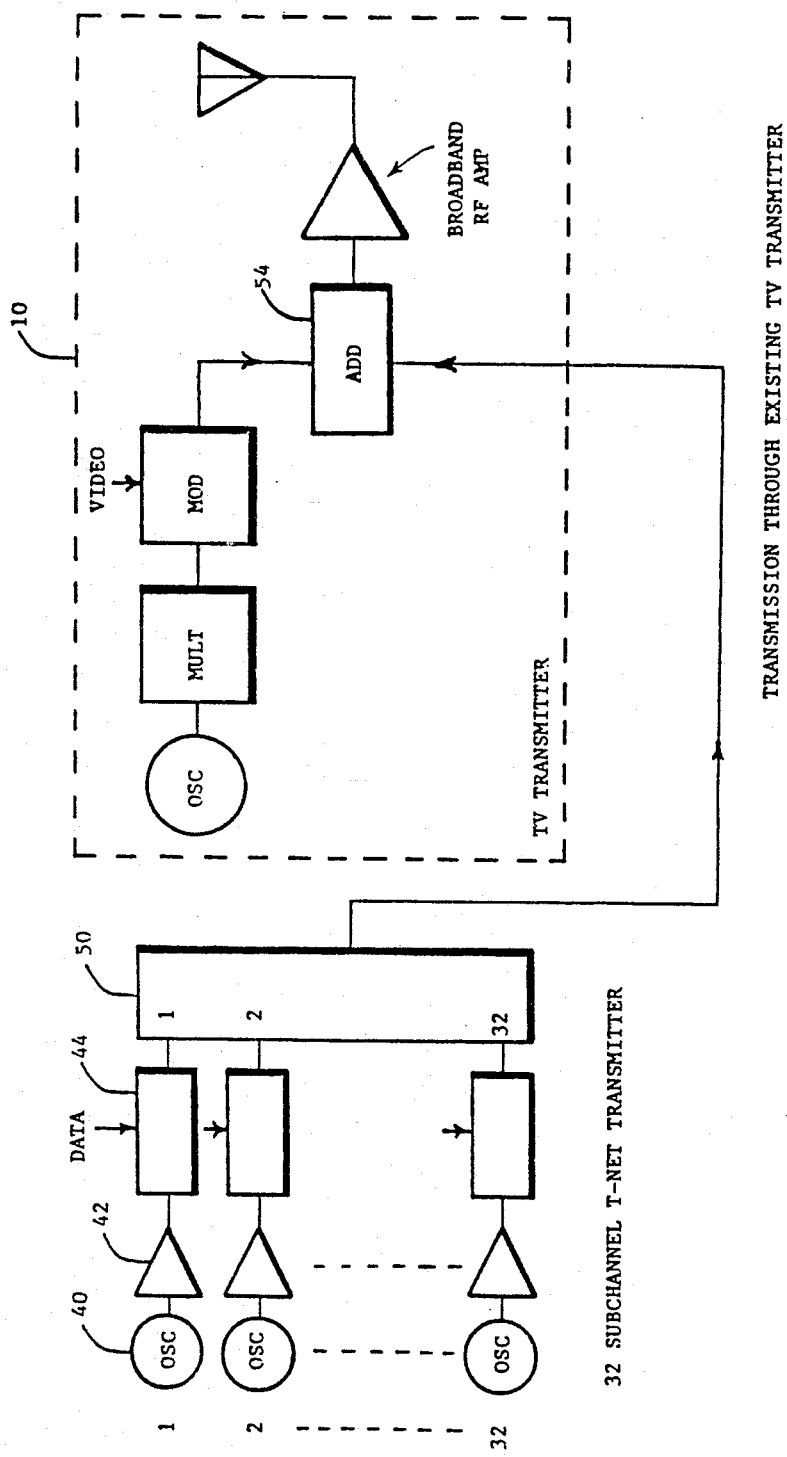
Figure 10C:
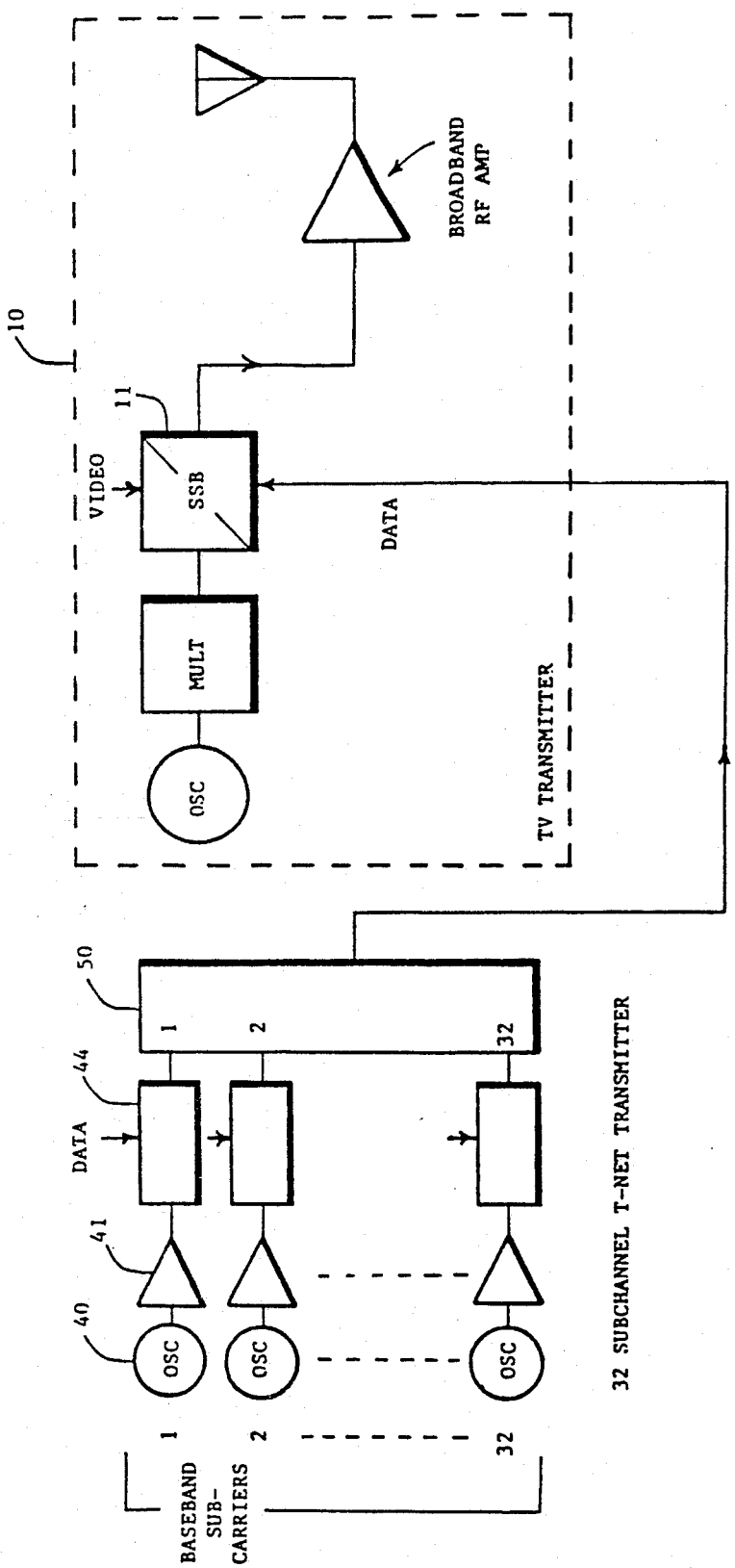

FIGS. 10b and 10c show two methods for transmitting down-link digital data. The RF subcarrier assembly of FIG. 10b, being already at the proper radio frequency, is "added" to the regular TV video carrier in 54 and radiates through the TV transmitter antenna. This is a method to piggyback T-NET data signals on an existing Host TV transmitter without interference because the T-NET subcarriers exist on an adjacent channel as previously explained. The Host TV transmitter may have to be retuned somewhat to permit this, however. In FIG. 10c the subcarriers are generated at baseband frequencies and they in turn modulate the existing TV carrier in SSB modulators 11: the data carriers on the low sideband and video on the upper sideband (with slight vestigial low sideband).

The alternative quadrature modulation method for impressing four bits of data on each subcarrier during each horizontal blanking interval for down-link data transmission will now be described. The gated subcarrier oscillator 40 (FIG. 9c) is split into two quadrature components and each of these components is modulated with two bits of data during each HBI. This is in contrast to the method described above wherein a single subcarrier component is modulated with four bits of data during the HBI. The method of using two quadrature subcarrier terms is attractive from the standpoint of minimizing the required radio spectrum bandwidth. It is also very attractive because low-cost large integrated circuits (called IC's or "chips") now exist for "color" television receivers that incorporate within them all of the circuits necessary to demodulate the chroma subcarrier and these can be adapted to demodulate the data subcarrier instead, as well as to detect the horizontal and vertical sync pulses and necessary control signals (AFT and AGC).

The manner in which the down-link subcarriers are quadrature modulated at the down-link transmitter end is relatively straight forward Referring to FIG. 9c, the output of subcarrier oscillator 40 is split into two quadrature components by shifting one signal path 90 degrees in phase shifter 41. The in-phase and quadrature signal is then amplitude modulated independently by 43 with 2 bits of data during each horizontal blanking interval. Of course subcarrier oscillator 40 itself only exist during the horizontal blanking interval (eleven microseconds) as explained before. Thirty-two oscillators identical to FIG. 9c could be provided for each antenna beam sector as previously explained.

Figure 11:
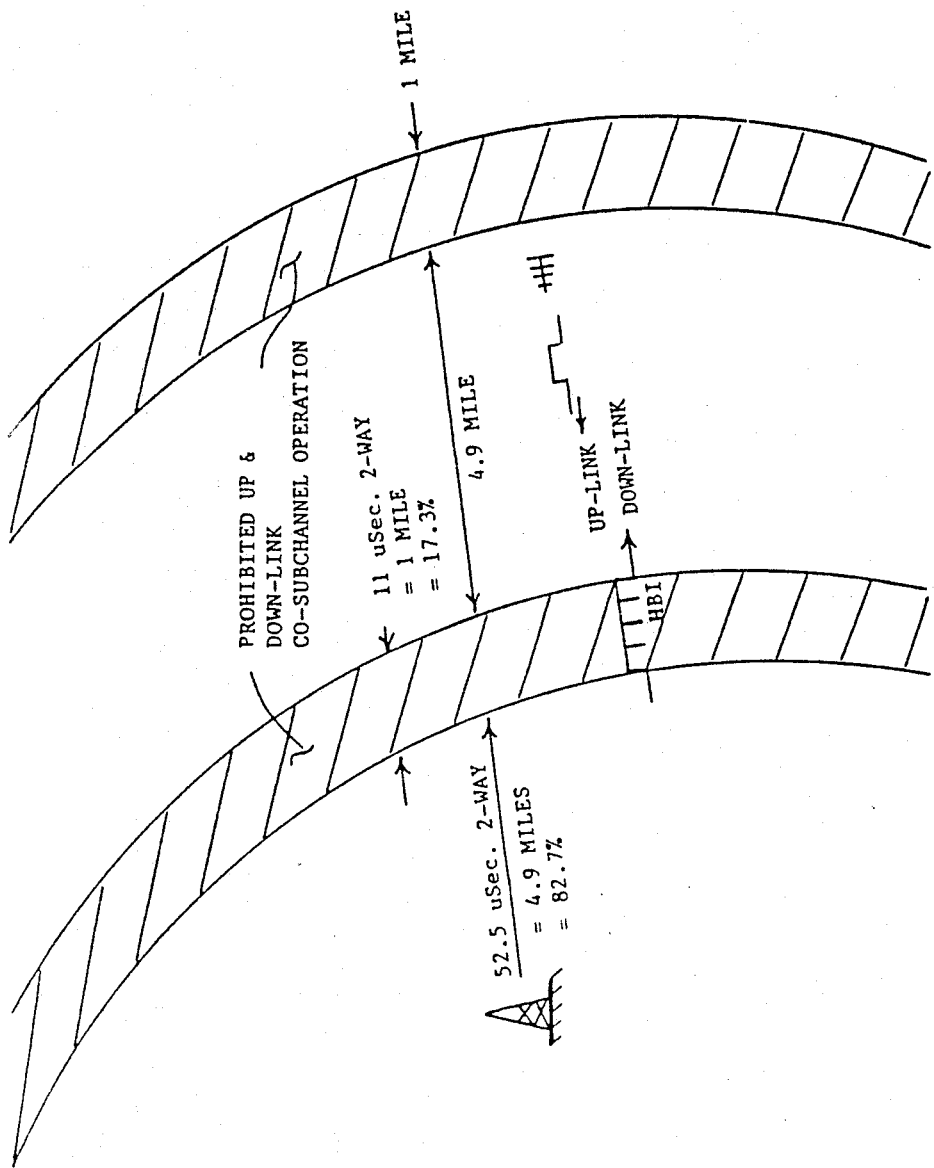
FIG. 11 is an illustration of the invention as applied to simultaneous up-link and down-link operation on the same subchannel.

It has been pointed out earlier in this specification that it is possible to use the same subchannel to transmit up-link as well as down-link, even at the same time. The use of separate subchannels for either up-link or down-link transmission is fairly obvious. However, to understand the use of a single subchannel for both up-link and down-link transmission at the same time requires some explanation. It has already been pointed out that the gated subcarriers used in the down-link exist only for approximately 11 microseconds coinciding with each Host TV horizontal HBI. The time between sync pulses is 63.555 microseconds and consequently the down-link subcarriers exist for only 17.3% of the total time (11/63.55=0.173). Hence the down-link subchannel is actually "off" and unused 82.7% of the time. As noted before, the HBI time interval containing down-link subcarriers propagates away from the television station with the speed of light and sweeps across the countryside to the maximum extent of the system's service area and beyond as shown in FIG. 11.

Since these gated subcarriers are only on for 17.3% of the time this leaves us with approximately 82.7% of the time free to listen for reply "echos". These echos are in fact digital up-link data as pointed out in the prior discussion. In order to share subchannels for simultaneous up-link and down-link transmissions one must be careful to permit only certain fixed subscriber locations to operate in this manner so as not to cause the receipt of a reply pulse from prohibited locations (FIG. 11) at the same instant a down-link subcarrier transmission is occuring. It would be difficult, if not impossible, to detect the weak "echos" from prohibited locations which arrive at the same time as one is generating a strong down-link transmission. These prohibited areas are shown in FIG. 11 as cross-hatched annular rings. The width of these rings, about one mile, represents approximately 17.3% of the total service range and occur every five miles. Subscribers located within these prohibited rings would not be able to us the same subchannel for simultaneous transmission and reception, however, those subscribers in prohibited areas could use a different subchannel for transmission and reception as is customary in radio transmission. Alternatively, a receiver substation 7 (FIG. 2) could be positioned "down-stream" so as to effectively move its prohibited areas away from those of radio central office 6 and thereby provide continuous coverage.

Synergetic Modulation. A point of novelty in the instant invention should now be explained. It was pointed out in the discussion relating to FIG. 9 that thirty-two subcarriers are positioned in the lower channel adjacent to the Host TV station signal (or alternatively on the upper adjacent channel). These subcarriers will in fact appear to the T-NET transponder receiver (FIG. 12b) as if they were lower sidebands of TV carrier Fc, even though they may have been independently generated, and even though they may be transmitted from a different location than the TV transmitter. Another way of explaining this is to point out that the "beat" frequencies which result when both the subcarriers and the TV main carrier Fc exist within the bandpass of the transponder receiver 34 (FIG. 12b) and are processed by detector 88; the result comprises envelop-modulation, comparable to SSB modulation of carrier Fc by the subcarriers. This envelope is demodulated by detector 88 as explained shortly.

Since this process of effectively appending sidebands to an existing signal (i.e. the TV carrier) to exploit its carrier energy and/or some of the modulation which it already carries e.g. H and V sync signals) appears to be a unique concept, it has consequently been labeled "synergetic modulation". Synergetic modulation is herein defined as follows: The creation of psuedo radio sidebands on an existing radio signal by means independent of the generator of that signal wherein said means are located at the same or a remote location to thereby enhance the reliability of the psuedo sideband transmissions and minimize mutual interference.

Equipment Design Options. Specific T-NET equipment and system configurations will now be described in detail. It will become evident to skilled communication workers that many variations of the basic T-NET system design concept can be implemented for various applications and consequently the following circuits and related illutrations represent only one preferred embodiment.

Figure 12A:
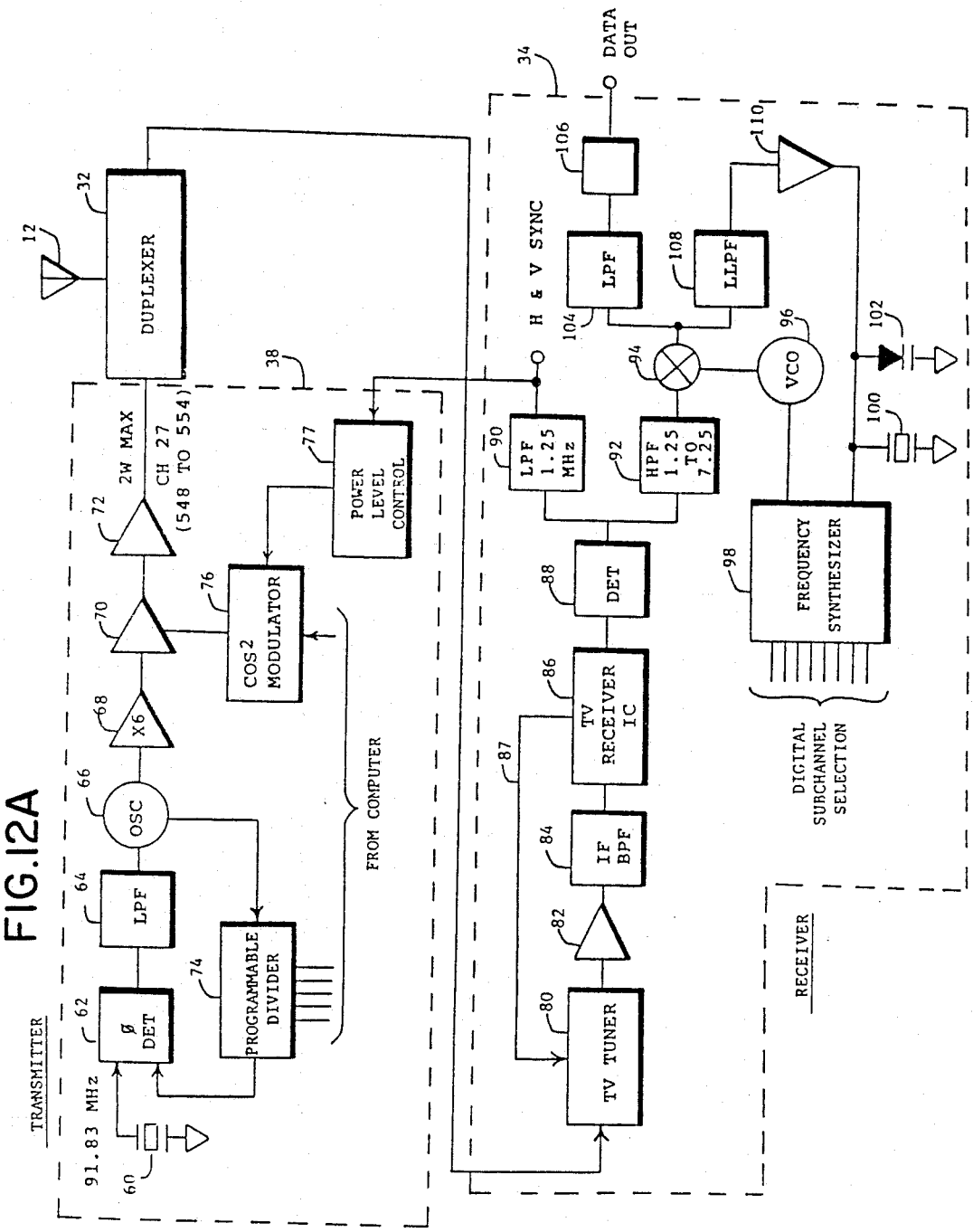
FIGS. 12A-12B is a block diagram of one embodiment of a typical subscriber transponder.

Transponder/Transmitter. FIG. 12 shows the RF subsections of a typical radio modem (or transponder) which may be employed in the instant invention. FIG. 12A, the transmitter section, is a relatively conventional radio transmitter design employing a fixed reference crystal oscillator 60 and a subchannel frequency synthesizer comprising phase detector 62, low-pass filter 64, variable oscillator 66 and programmable divider 74; all of these being combined in a circuit commonly called a phase-lock loop (PLL). The programmable divider 74 is controllable by the microprocessor 36 previously shown in FIG. 3. Thus the subchannel frequency of the transponder is controllable by that microprocessor and it in turn may be controlled by the remote network control center 2 (FIG. 1) so as to assign transponders to different subchannel frequencies dynamically at different times to optimize overall system traffic management.

The output of variable oscillator 66 is amplified and frequency multiplied in 68 and pulse modulated in 70 by cosine squared modulator 76. Modulator 76 is in fact a waveform generator that provides a pulse waveform having a smooth attack and decay shape (e.g. cosine squared) and this is done to optimize the spectral content of the transmitted pulses so that most of their radio energy falls within the desired subchannel bandwidth. Alternatively, the output of 68 can be split into quadrature terms, each term being modulated with one bit per HBI (equivalent to the down-link QAM method previously described). The pulsed output of modulator 70 is further amplified in 72 to a level of approximately 2 watts peak and connected through duplexer 32 to antenna 12 where it is radiated. Transmitted pulses are approximately 5 microseconds wide and the duty cycle is very low; the resulting average power of the transmitter is about 1.5 milliwatts at 300 baud. This is a very low average power and is therefore attractive for battery-powered operation.

Figure 12B:
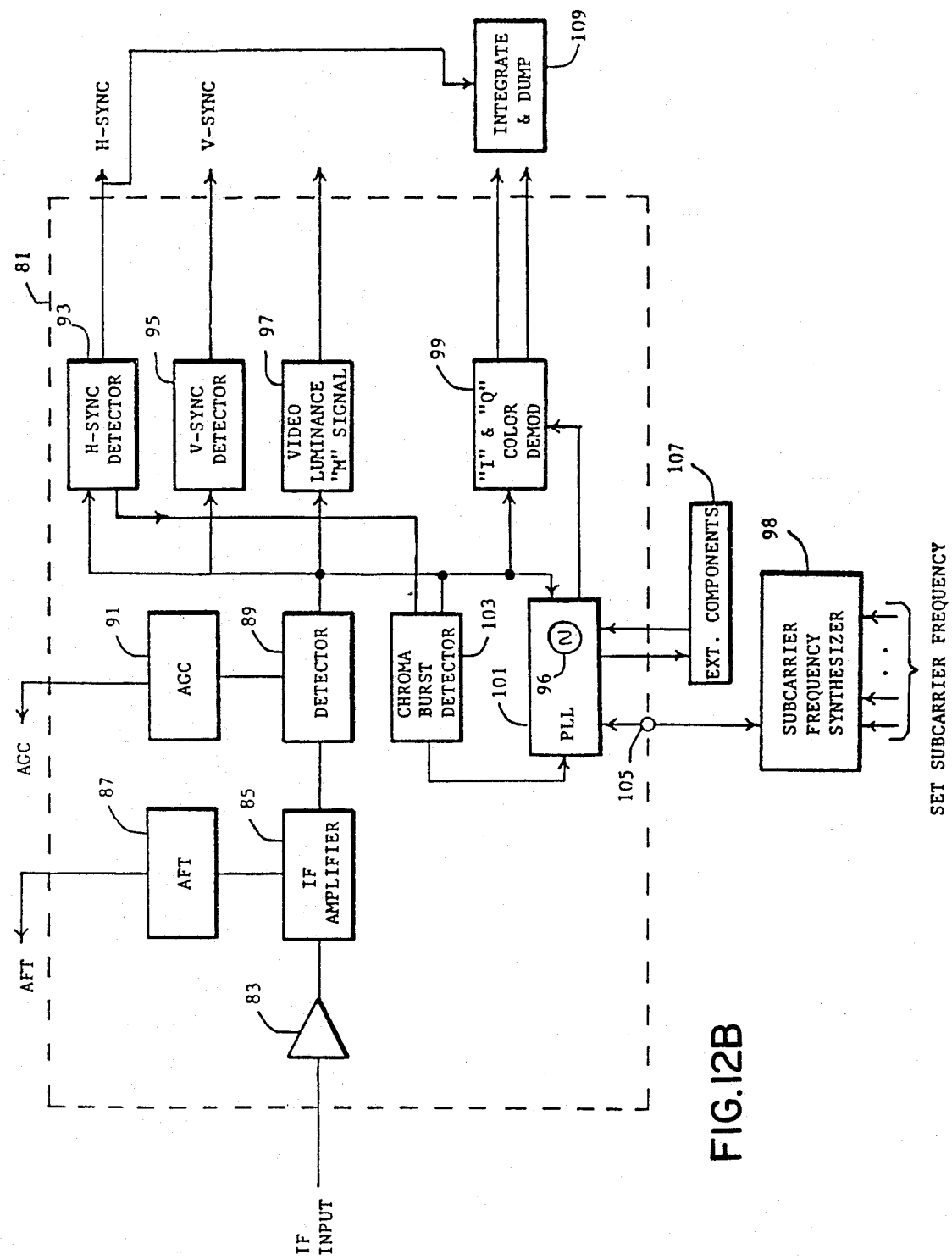

Transponder/Receiver. The transponder's receiver subsection is shown in FIG. 12b. It is intended to employ conventional integrated circuits designed for mass produced "black & white" television receivers and consequently uses relatively inexpensive and reliable piece parts. An alternative, using "color" TV circuits, is discussed later. Down-link signals are intercepted by antenna 12 and are connected to TV tuner 80 through duplexer 32. These signals are amplified in 82 and sent through intermediate frequency (IF) bandpass filter/amplifier (BPF) assembly 84 and connected to TV receiver integrated circuit chip 86. Receiver 86 feeds back a control signal 87 to TV tuner 80 to provide automatic frequency tuning (AFT). These are all conventional TV components; for example, 84 could include ceramic IF filters used in TV receivers. Detector 88 demodulates the down-link signals and removes the RF carrier to provide the TV sync and subcarrier baseband signals to both low pass filter 90 and high pass filter 92 connected in parallel.

The intermediate frequency (IF) tuned circuits of the receiver in FIG. 12B are tuned so as to encompas all thirty-two T-NET subcarriers as well as the television carrier Fc. Since the television signal includes lower vestigial sidebands below fc, they are included within the bandwidth of the receiver and are demodulated. Consequently, the output signals from detector 88 include all of the thirty-two subcarriers as well as most of the Host TV horizontal and vertical synchronizing pulse energy because that synchronizing pulse energy exists in the lower frequency components of the TV signal and passes through low pass filter 90. It consequently appears at the output of filter 90 as the H and V sync shown in FIG. 12B.

On the other hand, the data subcarriers exist between 1.25 and 7.25 MHz below the TV carrier Fc and they are filtered out by high pass filter 92 and sent to mixer 94 where a phase-lock loop arrangement provides for the selection and demodulation of only one of the thirty-two subcarriers. That phase-lock loop operates as follows. Frequency synthesizer 98, dynamically controlled by microprocessor 36 (FIG. 3), selects which of the thirty-two subcarriers will be demodulated. Frequency synthesizer 98 may be controlled by either companion devices such as a personal computer in the case where the receiver is inside an RF modem, or by the system network control center (NCC) in the same manner as it can control the progammable divider 74 of the transmitter section. In any event, frequency synthesizer 98 controls voltage controlled oscillator 96 to set it at a specific frequency precisely equal to the subcarrier frequency which is to be demodulated; this process occurs in mixer 94, low pass filter 108, amplifier 110, frequency control varactor 102, and crystal oscillator 100. Their operation is identical to the operation of a common phase-lock loop (PLL) which is well known. The result is that VCO 96 is kept precisely in tune with, and precisely in phase-lock with the average phase of the subcarrier which is to be demodulated. Phase fluctuations in the selected subcarrier will be smoothed out by low pass filter 108. However, fast phase fluctuations, which will represent the desired phase modulated digital data, are passed through low pass filter 104 and amplifier 106 and are sent to the microprocessor 36 (shown in FIG. 3). It will be recalled that the subcarriers are each gated to exist for only 11 microseconds and coincide with the HBI of the television signal. Within this HBI interval four bits of information is phase-modulated in the manner previously described in connection with FIG. 9. Thus the output of the receiver of FIG. 12B provides the H and V sync pulses of the Host TV signal as well as the down-link digital data in any one of the thirty-two subcarriers of the down-link subsystem.

The strength of the Host TV H-sync pulses coming out of filter 90 is indicative of the radio path attenuation between the Host TV and the subscriber. It is therefore a measure of the power required in the return (up-link) path. Based on the principal of reciprocity, power level control 77 (FIG. 12) provides a control signal to modulator 76 which establishes the desirable output power level of the up-link transmitter so as not to radiate excessive power yet guarantee adequate levels.

Transponder/Quadrature Receiver. Application of a TV color "chip" integrated circuit 81 of FIG. 12c to T-NET transponders will be explained in the following discussion to illustrate a practical economical design for detecting the alternative downlink quadrature modulation (FIG. 9c) but it should be emphasized that the essential feature of interest in this discussion has to do with the fact that this low-cost chip can be employed to demodulate both quadrature terms of the T-NET downlink subcarrier because it appears like the TV quadrature modulated chroma signal.

A typical TV integrated circuit 81 includes an IF preamplifier 83 and IF amplifier 85 and detector 89 that are relatively conventional in design and include provision for automatic frequency tuning (AFT) circuit 87 and automatic gain control (AGC) circuit 91. It also includes horizontal and vertical sync separation and detection circuits 93 and 95. It was pointed out earlier in this specification that in U.S. color television systems the television signal is coded and transmitted as three components: a monochrome luminence component "M" and two color components "I" and "Q" that are superimposed on a chroma subcarrier having a fixed precise frequency of 3.579545 MHz. That chroma subcarrier is quadrature modulated with the I and Q color signals essentially in the same manner which can be employed for the alternative modulation of the T-NET gated subcarriers (FIG. 9c).

In the case of color television transmissions, a brief "chroma burst" synchronizing signal is transmitted by the television transmitter (see FIG. 8) on the "back porch" of each horizontal sync pulse and its purpose is to phase-lock voltage controlled oscillator 96 (FIG. 12c) with all television receivers. Therefore phase-locked oscillator 96 can be used as a continuous phase reference to demodulate the I and Q components of the transmitted color TV signal. In color TV receivers the chroma burst detector 103 accomplishes that synchronizing process by using a time gate derived from H-sync detector 93 to gate out the approximately 8 cycles of chroma burst; those 8 cycles are applied to phase-lock loop circuit 101 which controls VCO 96 and thereby keeps it precisely in phase with the 8-cycle chroma burst. A precisely tuned quartz crystal at 3.579545 MHz is connected to terminal 105 and this causes phase-lock loop 101 and VCO 96 to remain precisely in phase with the chroma burst oscillation even after the burst ceases. VCO 96 in effect "coasts" during the time interval between chroma bursts with negligible drift.

The manner in which the color TV integrated circuit 81 can be adapted so that it can instead detect down-link quadrature modulated subcarrier digital signals of the instant invention will now be described. The objective is to use burst detector 103, the I and Q detector 99, phase-lock loop 101 and VCO 96 for this purpose. The subcarrier frequency synthesizer 98 previously described in regard to FIG. 12B is now connected in place of the chroma oscillator quartz crystal at input 105. It was pointed out earlier that the bandpass of the transponder receiver is tuned so as to pass only the thirty-two T-NET subcarriers and the Host TV carrier frequency. Thus it does not pass the 3.579545 MHz chroma burst or the chroma subcarrier. Consequently the chroma burst detector, being gated to operate only during specified portions of the horizontal blanking interval, will see instead a composite of many T-NET data subcarrier frequencies, depending upon which subcarriers are being employed for down-link data transmission. Since frequency synthesizer 98 is tuned to a specific subcarrier and is injecting signal into the phase-lock loop 101, it and VCO 96 can be forced to lock on to only that specific down-link subcarrier frequency. Consequently the reference frequency injected into I and Q detector 99 by VCO 96 causes detector 99 to demodulate the in-phase and quadrature phase (I and Q) digital data components of that specific subcarrier only.

Consequently the readily available and inexpensive "color" television integrated circuit 81 can be used to demodulate any one of the many quadrature modulated data subcarriers used in the instant invention. The output of detector 99 is connected to integrate and dump circuit 109 where a synchronizing signal based on the horizontal sync signal from 93 is used to accurately gate-out and optimumly detect the T-NET digital data of the subcarrier which has been selected. The very powerful Host TV carrier component and sync signals are consequently used to effectively "carry" and thereby enhance T-NET transmission reliability; i.e. the synergetic modulation advantage.

The transponder microprocessor 36 shown in FIG. 3 serves the purpose of coordinating the timing of the transponder's radio sections as well as buffer storing and relaying messages between it and the companion device (e.g. personal computer). It also performs certain housekeeping functions such as recognizing which incoming messages it is to detect and pass on. It also helps the network control center coordinate overall T-NET system traffic by dynamically shifting to subchannel frequencies assigned to it to transmit and receive on, either as directed by the network control center or as assigned by the companion device. The microrpocessor is conventional in its design and its programming is relatively straight forward.

Figure 13:
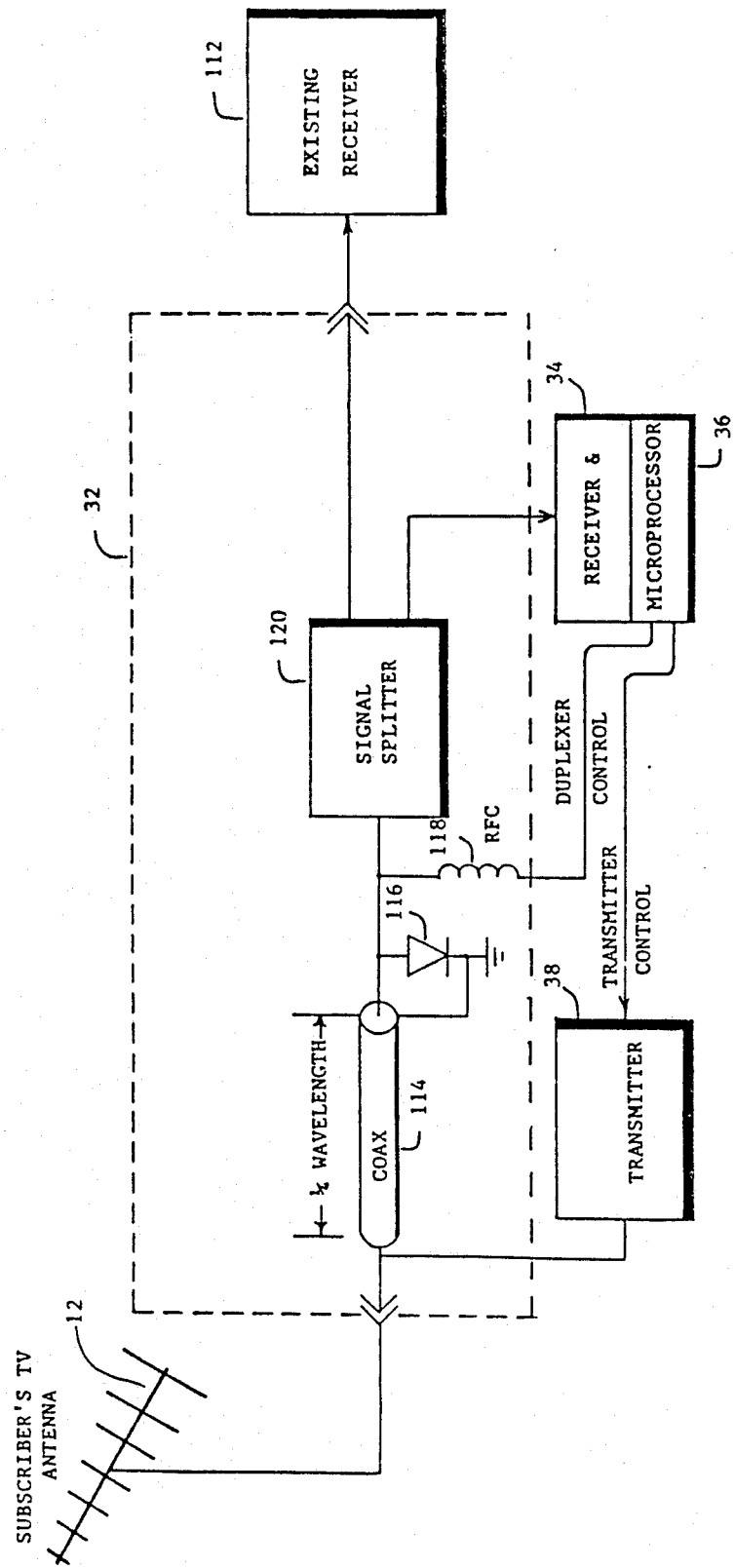
FIG. 13 is a block diagram illustrating one way in which an antenna duplexer may be constructed to permit sharing of an existing TV antenna between the transponder and the existing television receiver.

Transponder/Duplexer. The transponder duplexer 32 (FIG. 12) permits sharing of the subscriber's existing TV antenna with the existing television receiver, the transponder's receiver section, and its transmitter section. Its principal job is to isolate the transponder receiver and television rec iver from the transmitter section so that they will not be damaged while it transmits. FIG. 13 shows one possible duplexer design for isolating these receivers from the transmitter. The subscriber's TV antenna is connected to the transponder receiver and television receiver through a one-quarter wave length coaxial cable 114 which has at its output end a diode switch 116 that is controlled through a radio frequency choke 118 by microprocessor 36. When the transponder is required to transmit a data pulse, diode 116 is switched to a low impedance state by microprocessor 36 and this in effect short circuits the output end of coaxial cable 114 and causes a reflected open circuit impedance at its input end (the left side in FIG. 13). Consequently the RF pulses generated by transmitter 38 see an open circuit at the input to coax 114 and the signals are consequently routed on to the subscriber TV antenna and radiated outward.

On the other hand, when transmitter 38 is not transmitting, which is most of the time, signals coming into subscriber TV antenna 12 pass through coax 114 and into signal splitter 120 where they are routed both to the existing television receiver so that it may receive conventional television programs and also to receiver 34, which is part of the transponder. Under these receiving conditions transmitter 38 represents an open circuit and it rejects the incoming received signals.

Transponder duplexer 32 of FIG. 13 is only one of several methods which can be used. For example, devices referred to as microwave circulators comprise a three port passive network which can accomplish a comparable function and have the additional advantage of being broadband.

We shall now describe the major components of a radio central office and will emphasize the unique and novel circuits which have been devised to practice the instant invention.

Figure 14:
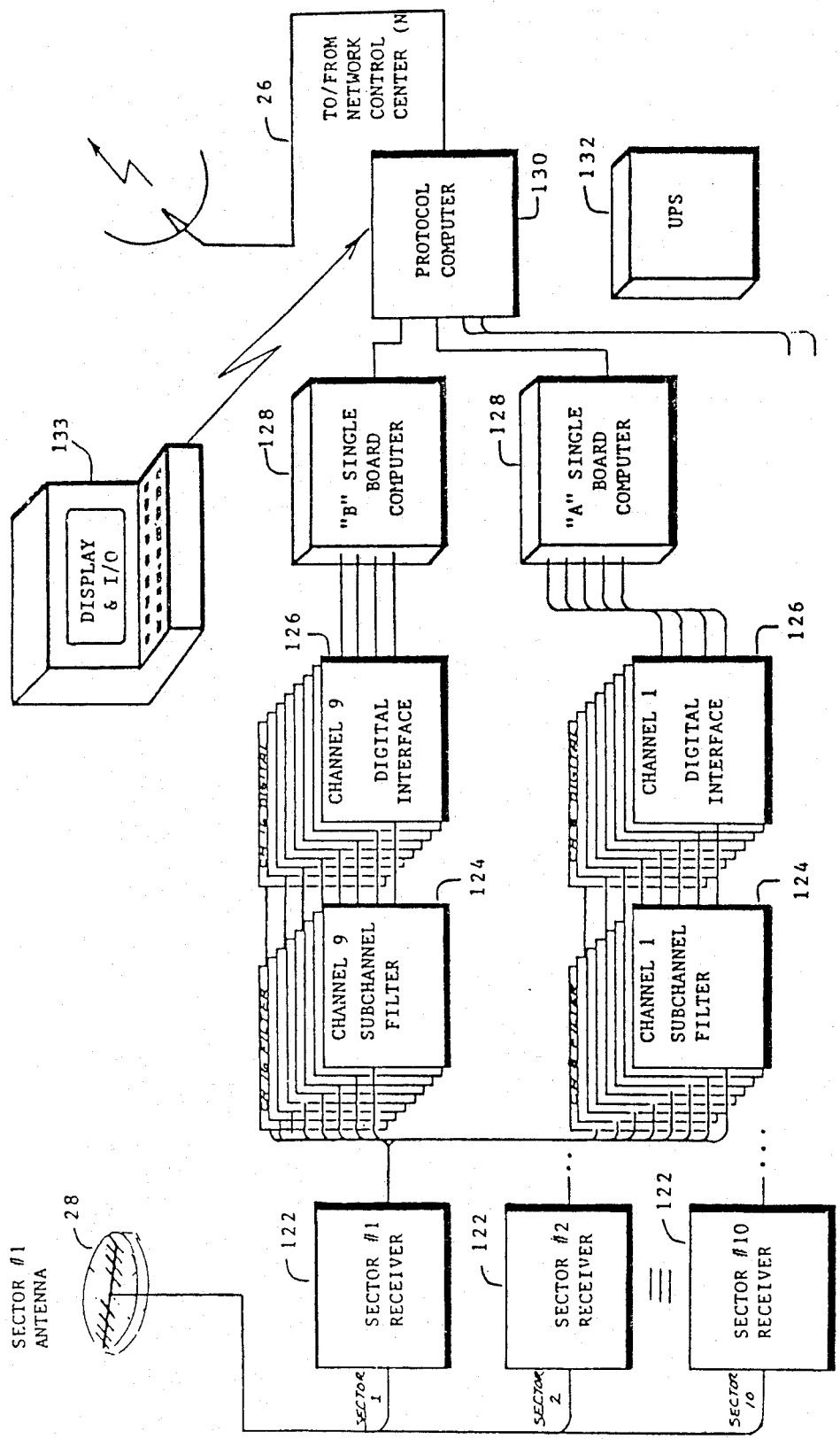
FIG. 14 is a block diagram of a radio central office.

Radio Central Office (RCO). FIG. 14 is an overall block diagram of a typical radio central office. Antennas 28 represent one of a plurality of directional antennas, each connected exclusively to a separate sector receiver 122. Each sector receiver 122 covers the entire 6 MHz TV channel which has been assigned to the T-NET system. For example, ten antennas 28, each having an 18-degree beamwidth, connected to ten receivers 122 will provide a 180-degree coverage. If each angular sector uses sixteen of thirty-two subchannels in a system where odd numbered subchannels are used on one sector, even numbered used on the adjacent sector, and the odd number again used on the next adjacent sector . . . etc., then the arrangement would be as shown in FIG. 14. In that case, each sector receiver 122 would require sixteen filters 124 and these are shown as divided into two banks of eight subchannel filters each; the bank of filters shown in the top row of FIG. 14 cover subchannels 9 through 16 and the lower row of eight filters cover channels 1 through 8. Each of the subchannel filters 124 is connected to its separate digital interface circuit card 126 and they are numbered in a corresponding manner.

In one preferred embodiment eight of these subchannel filters and associated digital interface circuits can be controlled from one single-board computer 128 and this is the reason that FIG. 14 shows two groups of eight subchannel filter/digital interface circuits connected to a "B" single-board computer 128, and 8 more subchannel filter/digital interface circuits connected to a "A" single-board computer 128. Thus sector #1 receiver feeds sixteen subchannel filters 124, sixteen digital interface circuit cards 126, and two single-board computers 128. If a T-NET system had ten sector antennas and ten associated sector receivers, there would be a total of three hundred sixty subchannel filters 124 and digital interface cards 126 and twenty single-board computers 128.

Protocol computer 130 (FIG. 14) collects the data from all single-board computers 128 and reformats and buffer stores it as necessary and then transmits it through trunkline 26 to network control center 2 (shown in FIG. 1). That trunkline may be any one of several commonly used links, such as a microwave link illustrated FIG. 14.

Display and I/0 133 shown in FIG. 14 is a computer monitor and input/output (I/0) device which may be employed to input the range address of the many subscribers who sign up for this communication service. It may also be used for overhead functions such as monitoring the activity of specific digital interface circuits 126, single board computers 128, or for trouble shooting purposes.

Figure 15:
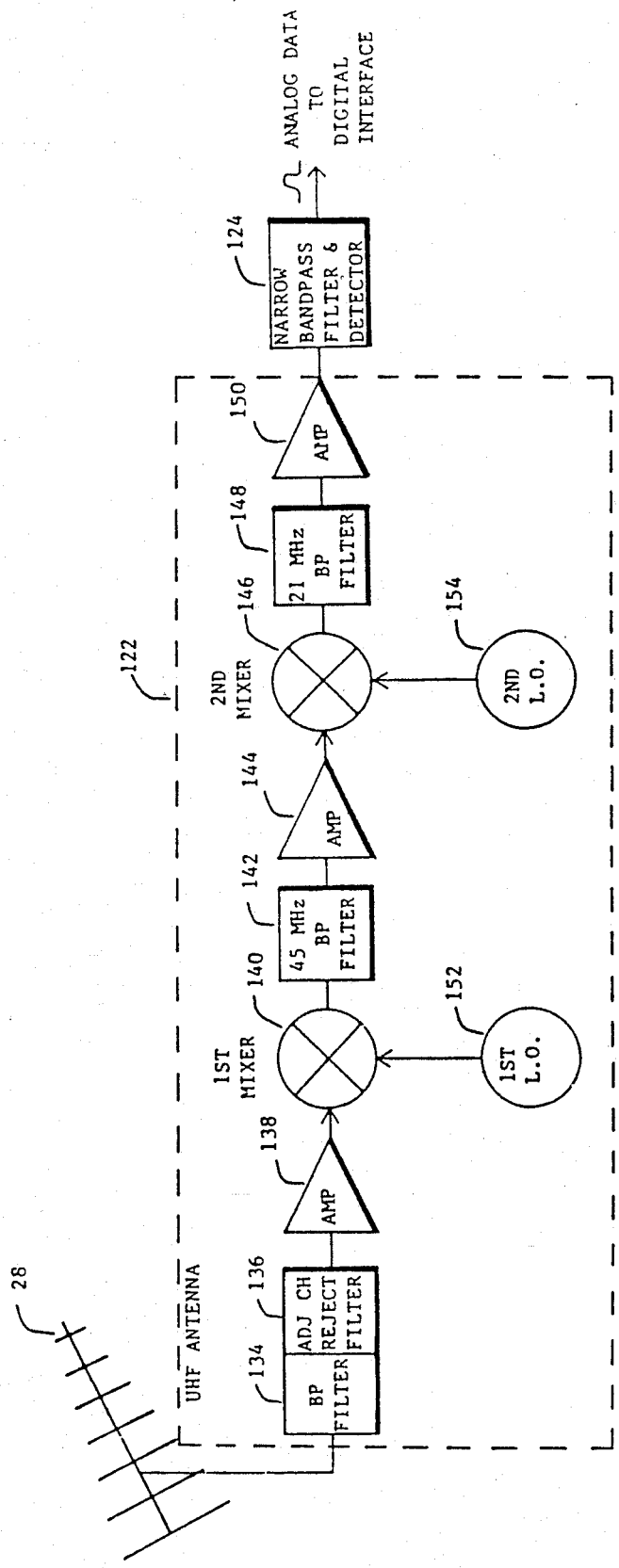
FIG. 15 is a block diagram of one embodiment of the central receiver.

RCO/Sector Receiver. FIG. 15 shows the block diagram of a typical sector receiver subsystem Antenna 28 detects up-link signals from subscriber transponders and connects them to bandpass filter 134 and adjacent channel rejection filter 136. These filters suppress most of the video components of the Host television signal and other interference to the level where they will not overwhelm the subscriber signals. It should be pointed out that typical television transmitters have an effective radiated power (ERP) ranging from 25,000 to two million watts or more and are consequently much more powerful than the subscriber signals. Incoming signals are further amplified in 138 and down converted in first mixer 140. Intermediate frequency (IF) filters 142 and amplifier 144 have approximately 6.0 MHz bandwidth and provide a sharp attenuation of all signals lying outside its bandwidth.

The output of amplifier 144 is connected to a second down converter mixer 146 and this is followed by a second IF filter 148 and amplifier 150. The second IF is 21 MHz and it also has 6.0 MHz bandwidth. All the thirty-two subchannels of a T-NET system are emcompassed within this bandwidth. The output of sector receiver 122 is connected in parallel to a bank of filters 24; one filter is required for each of the thirty-two subcarriers used in the sector. Included within these bandpass filters is a detector so that the output of each filter is the subcarrier baseband with analog data, i.e. it is the sum of all digital pulses transmitted by transponders in the sector. It has already been noted that each of the bandpass filter/detector assemblies for a sector could consist of sixteen subchannels so one sector would only operate on either odd channels or even channels in order to provide frequency re-use from sector to sector.

Figure 16:
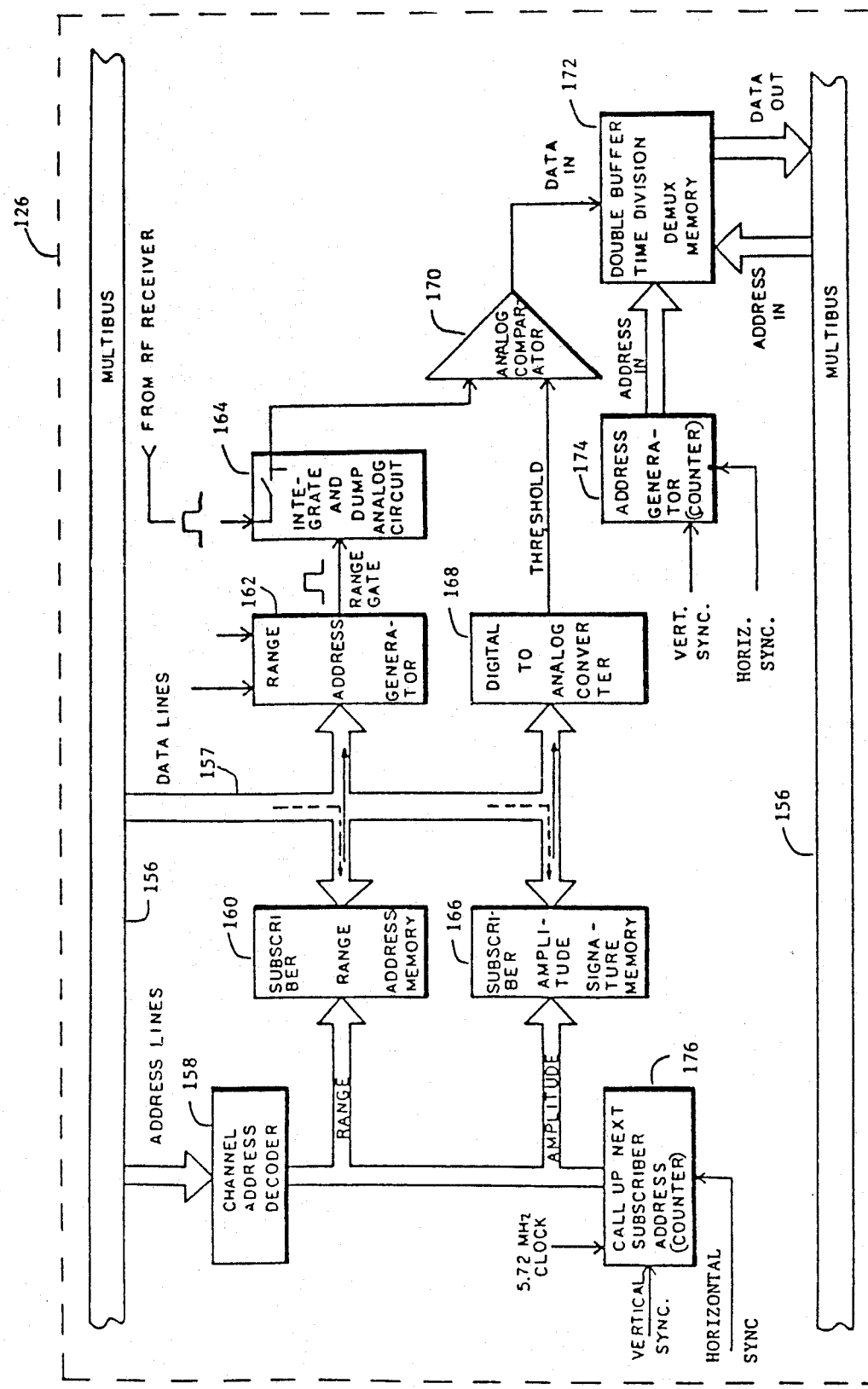
FIG. 16 is a block diagram of one embodiment of the digital interface circuits section of a central receiver.

RCO/Digital Interface. Each of the subchannel filters 124 has connected to its output a digital interface circuit card and a block diagram of that card is shown in FIG. 16. The purpose of the digital interface card is to create range gates at the proper time delay representing the distance to each of the many subscribers operating on that subchannel so as to detect pulse from them and forward the data to its companion single board computer 128 (FIG. 14). We shall now explain the novel aspects of the block diagram in FIG. 16. All circuits of digital interface card 126 are interconnected to other assemblies through a standard multi-bus 156. For example, it has already been pointed out that there will be eight digital interface cards for each single board computer 128 and these will be interconnected through multibus 156. Display and I/0 device 133 may also be connected through that multibus.

In one mode of operation the display and I/0 device 133 (FIG. 14) is used to input the range address of a new subscriber based on known or computed range to that subscriber and this information will be "logged" into subscriber range address memory 160 through channel address decoder 158 and data bus 157. At the same time, the strength of that subscriber signal will be either measured or estimated and that information will be input to subscriber amplitude signature memor 166 in like manner. Thus the range and amplitude of each subscriber transponder will be held in memory 160 and 166 respectively. The analog pulses from subchannel filter 124 representing incoming data from each transponder is connected to integrate and dump analog circuit 164.

The operation of digital interface card 126 is repetitive and triggered into operation by the vertical and horizontal sync pulses of the Host TV station as detected by a separate receiver using antenna 27 (FIG. 3). These sync pulses are connected to address generators 174 and 176. Upon this triggering, subscriber address counter 176 begins to count upward to generate addresses in a series of steps, each step being proportional to the distance the H sync pulses have propagated outward from the television station as it sweeps across the countryside. In other words subscriber address counter 176 will have developed a count which is equal to the distance from the television station to the instant position of the propagating Host TV horizontal blanking interval.

Subscriber address counter 176 is connected to the subscriber range address memory 160 and amplitude memory 166 and if those memory locations hold a subscriber, that fact is caused to trigger gate generator 162 and A/D 168. Thus a comparison is constantly being made by range address gate generator 162 to see if any subscriber lives at the currently developed address count; if there is, range gate address generator 162 generates a range gate which enables integrate and dump analog circuit 164 to accept and integrate the pulse from that specific transponder at that specific range address. At the end of a five microsecond integrate period the pulse from that transponder is instantaneously compared in comparator 170 against a threshold level which has been established by digital-to-analog converter 168, which in turn is dependent upon the expected strength of that subscriber. Based on the result of analog comparator 170 a determination is made as to whether there is a logic "1" transmission or a logic "0" (no transmission) from the transponder at that specific range address. It can be appreciated that these comparisons are done on a microsecond by microsecond basis and in accordance with a prearranged schedule depending upon which subscribers are logged in memory and what their distance is from the Host television transmitter. It can be further appreciated that pulses from many subscribers are all time interleaved and must be sorted out; that is the job of double buffer demux 172.

The double buffer demux 172 circuit has connected to it an address generator (counter) 174 which is triggered into operation by the Host TV vertical and horizontal sync pulses and it first generates a coarse time division component of subscriber address (i.e. the specific H-sync pulses that the transponder has been assigned to operate on) and a second fine time division address based on the range to each subscriber. Demux 172 also has as input the output of comparator 170 which comprises digital pulses from each of the many subscribers assigned to that subchannel. The double buffer demux 172 sorts out these time interleaved transponder pulses and reorganizes them into data files in which the data from each transponder is grouped together with the tranponder's address and placed into a buffer storage location. That buffer storage is periodically "dumped" into the multibus for transfer to the single-board computer 128. The single-boar computer 128 also receives like-data from seven other digital interface cards as shown in FIG. 14. The single-board computer groups all of this information and forwards it to protocol computer 130 where it is properly queued with the output of many other single board computers and forwarded over a trunklink 26 to the notwork control center as previously explained.

Cable TV Design. We shall now describe the application of the T-NET system to cable TV (CATV). CATV design engineers have found that a problem exists when many subscribers are connected to a coaxial cable for reverse transmissions from subscribers to a central location. This problem is due to the fact that each of the subscribers contributes a finite amount of noise and the cumulative effect of all of this noise seriously reduces each of their signal-to-noise ratios, and perhaps also the down-link TV program. This problem is self defeating in that increasing the power of each subscriber does not offer any solution because that also increases their cumulative noise. The instant invention solves this problem because the T-NET transponders only transmit pulses and these pulses only exist at time intervals which are distinct and separate for each transponder. Therefore their cumulative effect is negligible.

Figure 17:
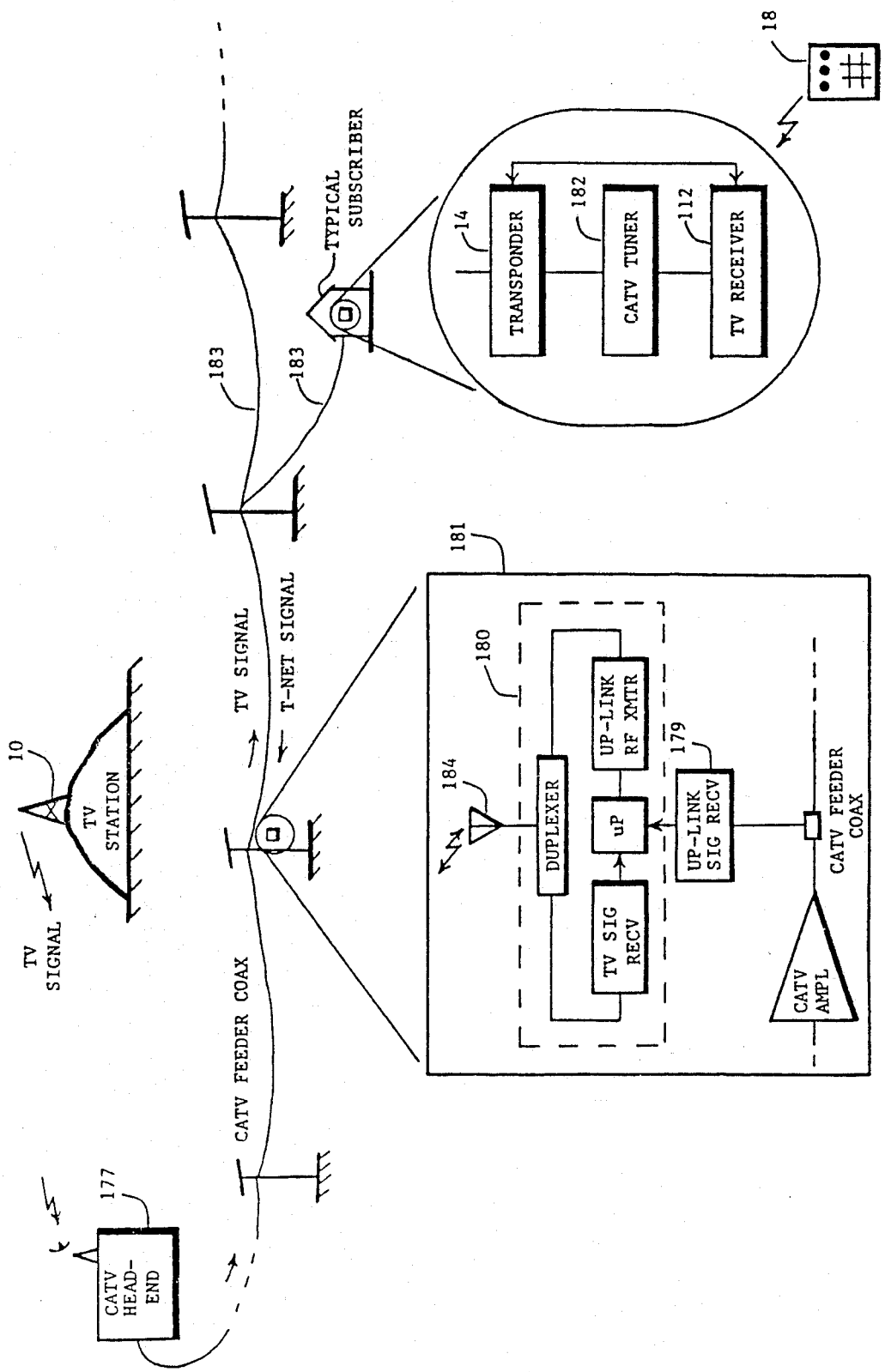
FIG. 17 is a block diagram of the invention as applied to provide two-way cable television.

FIG. 17 illustrates a cable TV application of the T-NET system. A transponder 14 operates substantially in the same way as described in the preceding sections of this specification. TV and data signals from the coaxial cable are connected through transponder 14 and CATV tuner 182 to TV receiver 112. The data output of transponder 14 is connected directly to TV receiver 112 to provide interactive television operation. The talk-back feature could be through hand-held remote controller 18.

Transponder 14 (FIG. 17) detects the down-link data and sync pulses of the Host TV station 10 signal injected at CATV "Head-End" 177 and receives in the same manner already described. The transponder 14 up-link reply pulses are sent through coaxial cable 183 and are collected at a multiplexed repeater 180 which could be located within the existing cable TV amplifier boxes 181 which are typically spaced at intervals less than one mile. The multiplexed repeater 180 can be designed to function essentially as a multiplexed pulse transponder (somewhat like 14) so as to collect and retransmit up-link signals detected by 179. These are appropriately synchronized to the local TV signal and radiated through antenna 184. Usually there would not be more than a few dozen transponders 14 connected between cable TV amplifier boxes. Their "range address" is determined by the Host TV-to-subscriber indirect distance which is the combined cable and over-the-air effective distance. The design of these multiplex transponders (repeaters) will be obvious to those skilled in the art after studying the several drawings and discussion presented in this specification and duly observing the H-sync requirements on the cable TV signal because it is off-set from the over-the-air TV signal H-sync.

The radio central office detects and process these semi CATV signals in much the same manner as it already processes transponder replies from purely over-the-air subscribers. The output of multiplex repeater 180 would in fact appear like interleaved pulses from several dozen transponders. The fact that these particular CATV trasnponders operate partly through a coaxial cable would be transparent to the radio central office. A similar arrangement could be used in large office buildings which use a coaxial cable and common antenna.

Vehicle Location Design. We shall now discuss a vehicle location application of the T-NET system (FIG. 18). It has been pointed out that the range to each fixed location subscriber represents its "range address" and this information is kept in memory in each radio central office. On the other hand, if the transponder is a portable device or in a vehicle, then its range will initially be unknown. Specific subchannels can be dedicated to operate only with such moving transponders When a precise determination of the transponder location is desired, the T-NET system can be desi9ned to provide for detection of up-link si9nals by at least two central receivers labeled #1 and #2 in FIG. 18. The position and distance between these two central receivers will be precisely surveyed to establish a fixed baseline from which the position of each transponder can be accurately computed based on precise measurement of the range from the transponder to central receivers #1 and #2. Such computations are well known and commonly employed in radio navigation. FiG. 18 shows such an operation in which vehicle 186 detects Host television data and sync signals through mobile antenna 188 and connects those signals to RF modem 14. The demodulated signals from modem 14 are connected to vocoder 194 and to computer/monitor 196.

Up-link data pulses from modem 14 are detected by both central receiver #1 and #2 through their antennas 128. Since the range to the transponder is unknown initially, a series of sequential range gates is generated by central receiver #1 and #2 and each of these gates is examined in sequence to find where pulses are being received When this is determined, a pair of range gates, called an "early" and "late" gate in radar terminology, are positioned around the received pulses so as to track it as the vehicle moves. Such pulse acquisition and tracking techniques are well known in the art of radar circuit design. The range information which is thus measured is communicated from central receiver #2 to central receiver #1 where a navigation computation algorithm can be installed in a conventional computer to solve the triangulation problem to precisely locate and track vehicle 186. That position information can be forwarded to the network control center and/or to a Host such as a vehicle dispatcher. Indeed, the navigation computer could be installed at the Host computer, if that were more convenient.

The vocoder 194 (FIG. 18) is intended to be a voice-to-digital and digital-to-voice converter which takes the output of microphone 190 and digitizes it so that it may be sent through RF modem 14. Likewise, the digitized output of modem 14 can be converted to voice signals and transmitted through speaker 192. This provides a means of verbal communication through RF modem 14. If RF modem 14 operates at 1200 baud, then it is too slow for direct digitized voice transmissions, however, microprocessor 36 in RF modem 14 can buffer-store and thus time-stretch and compress the 1200 baud digitized voice information in such a manner as to make it intelligible, although it may not permit effective real-time dialog between two speakers because of the time delay. This is referred to herein as "slow-voice" or "voice messaging". On the other hand, RF modem 14 could be designed to transmit at a rate up to 15,734 baud and this is sufficiently fast to provide real-time voice transmissions through a vocoder 194, if this were desirable.

Down-Link Co-channel Modulator. We shall now describe the manner in which digital data may be sent co-channel simultaneously with a regular television program without interfering with it. This is referred to as co-channel multiplexed data and video in FIG. 19. It has already been explained that the object of this technique is to superimpose digital data onto the regular television video on each of the 525 lines of a TV frame and then, on the succeeding frame, to superimpose the same digital data, but inverted, so that at each corresonding element (pixtel) of the TV picture the data is first added and then subtracted so as to become invisible. It was pointed out that this could be done throughout the entire TV picture at a sacrifice in picture quality in motion segments, or it can be restrained to only those portions of the picture that convey fixed scenes.

Figure 19:
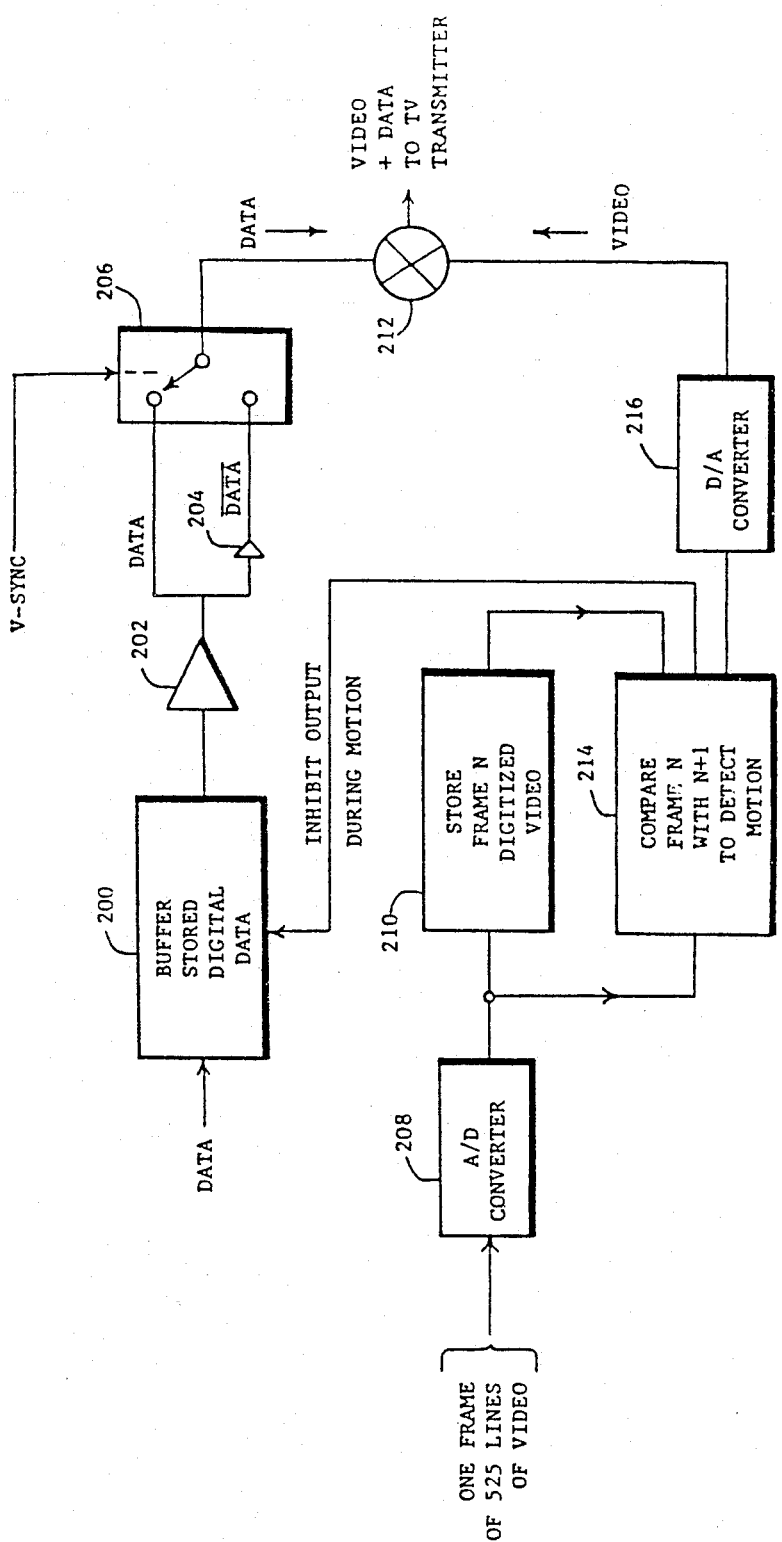
FIG. 19 illustrates the co-channel down-link digital video transmission technique.

FIG. 19 shows the block diagram of a system of this invention for sending digital data only in the fixed scen portion of TV pictures. The digital data to be transmitted is buffer-stored in digital memory 200 and read out from that storage device at prescribed times and sent through amplifier 202 to a split channel to provide data and inverted data into switch 206. One frame of 525 lines of regular TV video is connected to A/D converter 208 where it is digitized and stored in memory 210. The video from a following frame of 525 lines is compared pixtel-by-pixtel in 214 against the corresponding information stored from the previous frame in order to detect where differences (motion) exist. Where the second and first frame picture elements are identical, it is assumed to represent a fixed scene segment and in that event an enable command is sent by 214 to buffer store 200 and digital data is output from that buffer and is connected to summing circuit 212. Switch 206 use TV V-sync to reverse its position every TV frame so that the data is first added in one frame and subtracted in a subsequent frame.

In effect comparator 214 is constantly comparing the output of the current TV frame against the previous TV frame in order to find fixed scene locations so that it can transmit data in those segments. The output of 214, being the current frame, is D/A converted in 216 so as to restore the original analog video which is sent to summing circuit 212 where the data is added to it. The output of summing circuit 212 represents video plus and minus data and it is sent to the regular TV transmitter for transmission to TV viewers and to transponders specifically designed to detect the data portion of the TV signal. Such data receivers could operate essentially like present day Teletext receivers but it would include circuits which take advantage of the redundant transmission (i.e. Data+$\overline{\text{DATA}}$) for more reliable detection.

T-NET/Cellular Radio Integration. The vehicle location capabilities of the T-NET system can be used to advantage to initiate and coordinate the hand-off of cellular radio telephone subscribers. FIG. 20 illustrates such an application. Two T-NET radio central offices labeled RCO #1 and RCO #2 are located with respect to cellular system 218 so that they may determine the position of any vehicle 222. Although the hexagon shape 220 defining the various cellular limits are useful in popular descriptions of the idea that cellular radio is partitioned into individual cells, it is clear in actual practice the geometry of any specific cell may take any arbitrary shape such as 224. This is due to the fact that the only information available to the cellular radio system as to the position of vehicle 222 is its signal strength. Signal strength is not a reliable indicator of vehicle position because it varies from time to time and because of local reflections from buildings, other vehicles and for other physical reasons. On the other hand, using a relatively simple radio survey, a geometric area such as 224 can be found where reliable transmission with all vehicles in that area can be established and maintained. Many areas such as 224 can be found so that complete coverage of the entire service area 218 can be assured. In a practical world those areas 224 constitute the real cells.

Consequently if one has independent means such as a T-NET system to determine in which cell 224 a subscriber is located, then the problem of handing-off vehicle 222 as it moves from cell-to-cell becomes a relatively simple computer function. This is also a relatively simple process for the T-NET vehicle location mode to accomplish. It would also occupy very little of its traffic capabity. Furthermore, a specialized T-NET transponder could be designed and built for this function alone to reduce its cost and increases its reliability in this operating mode.

While the invention has been particularly shown and described with reference to preferred embodiments thereof, it will be understood by those skilled in the art that various changes in form and details may be made therein without departing from the spirit and scope of the invention

I claim:

1. A bidirectional wireless digital communication system comprising
    a broadcast station for transmitting a video signal at least including horizontal blanking intervals and associated horizontal sync signals on a video carrier;
    broadcast means for controllably transmitting downlink digital data signals:
    a plurality of subscriber receiver-transmitters, each subscriber receiver-transmitter having a subscriber receiving means for receiving said video signal and detecting said horizontal sync signals, and for receiving and detecting said downlink digital data signals, each subscriber receiver-transmitter also having a subscriber transmitting means coupled to said subscriber receiving means for transmitting uplink digital data signals only during at least some of the horizontal blanking intervals of the received video signal; and
    at least one central receiver, each said central receiver being a means for receiving and detecting said uplink digital data signals transmitted by each subscriber transmitting means.

2. The system of claim 1 wherein said broadcast means includes means for modulating said downlink digital data on a downlink data carrier having a substantially fixed relationship to and different from said video carrier prior to transmitting said downlink digital data signals.

3. The system of claim 2 wherein said video carrier is the video carrier of a first conventional television channel.

4. The system of claim 3 wherein said downlink data carrier is in the frequency band assigned to a conventional television channel adjacent said first conventional television channel.

5. The system of claim 4 wherein said broadcast means includes means for modulating downlink digital data on a plurality of downlink data carriers, each of said downlink data carriers being different from the others and within the frequency band assigned to a conventional television channel adjacent said first conventional television channel.

6. The system of claim 5 wherein said downlink data carriers are sufficiently separated in frequency whereby the modulated downlink digital data on each downlink data carrier may be received and uniquely detected in a subscriber receiver, at least in part by frequency discrimination.

7. The system of claim 6 wherein the modulated downlink digital data is quadrature amplitude modulated on said downlink data carriers.

8. The system of claim 5 wherein multiple bits of downlink digital data are transmitted on each downlink data carrier during at least some of the horizontal blanking intervals, and wherein the baud rate during the horizontal blanking intervals is a harmonic of the repetition rate of the horizontal sync signals, whereby bit clocks may be synthesized from the horizontal sync signals.

9. The system of claim 1 wherein each subscriber transmitting means includes means for modulating uplink digital data on an uplink data carrier having a substantially fixed relationship to and different from said video carrier prior to transmitting uplink digital data signals.

10. The system of claim 9 wherein said video carrier is the video carrier of a first conventional television channel.

11. The system of claim 10 wherein said uplink data carrier is in the frequency band assigned to a conventional television channel adjacent said first conventional television channel and wherein said modulated uplink digital data is transmitted by a subscriber transmitting means only in at least some of the horizontal blanking intervals of said video signals as received by the respective said subscriber receiving means.

12. The system of claim 1 wherein said video carrier is the video carrier of a first conventional television channel and wherein at least some of said subscriber transmitting means include means for modulating uplink digital data on a different one of a plurality of uplink data carriers, each of said plurality of uplink data carriers being a different frequency from the others and within the frequency band assigned to a conventional television channel adjacent said first conventional television channel.

13. The system of claim 12 wherein said uplink data carriers are sufficiently separated in frequency whereby the modulated uplink digital data on each uplink data carrier may be received and uniquely detected in said central receiver, at least in part, by frequency discrimination.

14. The system of claim 13 wherein the modulated uplink digital data is quadrature amplitude modulated by said uplink data carriers.

15. The system of claim 12 wherein multiple bits of uplink digital data are transmitted on each uplink data carrier during at least some of the horizontal blanking intervals, and wherein the baud rate during the horizontal blanking intervals is a harmonic of the repetition rate of the horizontal sync signals, whereby bit clocks may be synthesized from the horizontal sync signals.

16. The system of claim 12 wherein said broadcast means includes means for modulating downlink digital data on a plurality of downlink data carriers, each of said downlink data carriers being different from the others and within the frequency band assigned to a conventional television channel adjacent said first conventional television channel.

17. The system of claim 16 wherein at least some of said downlink data carriers and at least som of said uplink data carriers have the same carrier frequency.

18. The system of claim 17 wherein said broadcast means transmits downlink digital data on a downlink data carrier during a horizontal blanking interval in which a subscriber transmitting means transmits uplink digital data on an uplink data carrier of the same frequency as the last named downlink data carrier, said downlink and uplink data signals being distinguishable by said at least one central receiver, at least in part, by the difference in arrival times of the transmitted signals.

19. The system of claim 1 wherein said broadcast means is physically independent of said television broadcast station, and includes receiving means for receiving said video signal from said television broadcast station and detecting said horizontal sync signals to determine when said broadcast means is to transmit digital data signals.

20. The system of claim 1 wherein said broadcast means is coupled to said television broadcast station, whereby said television broadcast station broadcasts through its antenna a video signal at least including horizontal blanking intervals and associated horizontal sync signals, at least some of said blanking intervals including a digital data signal.

21. The system of claim 1 wherein said at least one central receiver is positioned approximately between said televisio broadcast station and said plurality of subscriber receiver-transmitters.

22. The system of claim 1 wherein said television broadcast station transmits a video signal comprising regular television programming, said broadcast means being coupled to said television broadcast station so that said television broadcast station broadcasts through its antenna regular television programming and downlink digital data, said downlink digital data being transmitted as video information by adding said downlink digital data to at least part of the video signal during one video frame and subtracted from the corresponding part of the video signal during the next video frame.

23. The system of claim 22 wherein the parts of the video signal to which downlink digital data are added and to which downlink digital data are subtracted are portions of the video signal which are substantially unchanged during the two successive video frames.

24. The system of claim 1 wherein said television broadcast station antenna is substantially colocated with the broadcast antenna of at least one more television channel, and wherein the video signals of each of said substantially colocated channels are synchronized so that the horizontal blanking signals thereof coincide in time.

25. A system in accordance with claim 1 for two way paging wherein said subscriber receiver-transmitters are mobile.

26. A bidirectional wireless digital communication system comprising
a television broadcast station for transmitting ordinary television programming including vertical sync and horizontal sync signals and associated blanking intervals on a preassigned television channel and associated video carrier;
broadcast means for controllably transmitting downlink digital data signals;
a plurality of subscriber receiver-transmitters distributed about an area within the broadcast range of said television broadcast station and said broadcast means, each subscriber receiver-transmitter having a subscriber receiving means for receiving said video signal and detecting sync signals, and for receiving and detecting said downlink digital data signals, each subscriber receiver transmitter having modulating means for modulating uplink digital data signals on an uplink carrier of a frequency within the frequency band of a television channel adjacent said preassigned television channel, each subscriber transmitting means coupled to said subscriber receiving means for transmitting the modulated uplink digital data signals during at least some of the blanking intervals of the received video signal; and a plurality of central receivers, each central receiver being located and having a directional antenna to predominately receive the modulated uplink digital data signals from a respective subarea within said area, each said central receiver being a means for receiving and detecting said uplink digital data signals transmitted by the respective subscriber transmitting means within the respective subarea.

27. The system of claim 26 wherein each subscriber transmitting means includes means for modulating uplink digital data on an uplink data carrier having a substantially fixed relationship to and different from said video carrier prior to transmitting uplink digital data signals.

28. The system of claim 27 wherein said uplink data carrier is in the frequency band assigned to a conventional television channel adjacent said first conventional television channel and wherein said modulated uplink digital data is transmitted by a subscriber transmitting means only in at least some of the blanking intervals of said ordinary television programming as received by the respective said subscriber receiving means.

29. The system of claim 26 wherein at least some of said subscriber transmitting means include means for modulating uplink digital data on a different one of a plurality of uplink data carriers, each of said plurality of uplink data carriers being a different frequency from the others and within the frequency band assigned to a conventional television channel adjacent said preassigned television channel.

30. The system of claim 29 wherein said uplink data carriers are sufficiently separated in frequency whereby the modulated uplink digital data on each uplink data carrier may be received and uniquely detected in said central receiver, at least in part, by frequency discrimination.

31. The system of claim 30 wherein the modulated uplink digital data is quadrature modulated by said uplink data carriers.

32. The system of claim 30 wherein multiple bits of uplink digital data are transmitted on each uplink data carrier during at least some of the horizontal blanking intervals, and wherein the baud rate during the horizontal blanking intervals is a harmonic of the repetition rate of the horizontal sync signals, whereby bit clocks may be synthesized from the horizontal sync signals.

33. The system of claim 30 wherein said broadcast means includes means for modulating downlink digital data on a plurality of downlink data carriers, each of said downlink data carriers being different from the others and within the frequency band assigned to a conventional television channel adjacent said first conventional television channel.

34. The system of claim 33 wherein at least some of said downlink data carriers and at least some of said uplink data carriers have the same carrier frequency.

35. The system of claim 34 wherein said broadcast means transmits downline digital data on a downlink data carrier during a horizontal blanking interval in which a subscriber transmitting means transmits uplink digital data on an uplink data carrier of the same frequency as the last named downlink data carrier, said downlink and uplink data signals being distinguishable by said at least one central receiver, at least in part, by the difference in arrival times of the time signals.

36. A system in accordance with claim 1 for two way paging wherein said subscriber receiver-transmitters are mobile.

37. A system in accordance with claim 26 for interactive television wherein said subscriber receiver-transmitters are coupled to a television receiver for displaying on a display the ordinary television programming and for also displaying downlink information, said subscriber receiver-transmitters including means for user entry of uplink digital data at the respective subscriber receiver-transmitter.

38. The system of claim 26 wherein said subscriber receiving means and said subscriber transmitting means both share a television antenna with at least one ordinary television receiver.

39. A method of information communication within an area utilizing the frequency band of a television channel adjacent that of a television channel serving the same area and broadcasting ordinary television programming, including horizontal and vertical sync signals and associated blanking intervals, comprising the steps of:
  (a) modulating information on a carrier within the frequency band of the television channel adjacent that of the television channel broadcasting ordinary television programming;
  (b) transmitting the modulated information only during the horizontal blanking intervals of the ordinary television programming;
  (c) receiving the transmitted modulated information at a distant location and detecting the information therein.

40. The method of claim 39 wherein in step (c), the information is detected in part by also detecting the horizontal sync signals of the ordinary television programming and referencing the detection thereto.

41. The method of claim 40 wherein the detection of step (c) is referenced to both the horizontal sync signals of the ordinary television programming and the known distance between the position of transmitting of step (b) and the position of receiving of step (c).

42. The method of claim 39 wherein instep (b) the transmission is from the same antenna as the television channel broadcasting ordinary programming material.

43. The method of claim 39 wherein in step (b) the transmission is from a different antenna as the television channel broadcasting ordinary programming material.

44. The method of claim 43 wherein is step (c), the transmitted modulated information is received using a directional antenna located approximately between the location of broadcast of the ordinary television programming and the location of the transmission of step (b).

45. A method of communicating information from a plurality of remote locations to a central location served by a television station broadcasting ordinary television programming in the frequency band of a first preassigned television channel, the television programming including horizontal and vertical sync signals and associated blanking intervals, comprising the steps of:
(i) at each remote location;
  (a) receiving the ordinary television programming and detecting the horizontal sync signals thereof,
  (b) modulating the information to be communicated from each remote location onto a carrier having a frequency in the frequency band of a preassigned television channel adjacent the frequency band of the first preassigned television channel, (c) transmitting the modulated information during at least some of the horizontal blanking intervals of the received television programming, and
(ii) at least one central location
   (d) receiving the transmissions of step (c) and detecting the information therein.

46. The method of claim 45 wherein the detection of step (d) is referenced to the horizontal syn signals of the ordinary television programming.

47. The method of claim 46 wherein the information is in digital form, whereby the carrier of step (b) is a data carrier.

48. The method of claim 47 wherein a plurality of data carriers are used, each having a frequency in the frequency band of a preassigned television channel adjacent the frequency band of the first preassigned television channel, each remote location modulating the data in step (b) on a specific one of the data carriers assigned thereto.

49. The method of claim 48 wherein said data carriers are distributed throughout the frequency band of the respective television channel.

50. The method of claim 48 wherein in step (b) the modulated information is transmitted only during specific horizontal blanking intervals as assigned to that remote location, whereby the transmission from different remote locations may be during different horizontal blanking intervals to provide a plurality of data channels.

51. The method of claim 50 wherein the specific horizontal blanking intervals used for transmission in each remote location are determined with reference to the reoccurence of the vertical sync pulse of the ordinary television programming.

52. The method of claim 51 wherein the detection of step (d) is further referenced in time to the known distances of transmission, whereby data may be modulated on the same data carrier at different remote locations in step (b) and transmitted during the same horizontal blanking intervals in step (c) and unambiguously detected in step (d) by range gating at the detector, thereby providing additional data channels differing in range.

53. The method of claim 52 wherein plurality of central locations are used for step (d) and wherein the reception of step (d) is by way of a directional antenna, whereby different central locations will receive and detect digital data from different groups of remote locations, providing still additional data channels.

54. The method of claim 53 wherein said plurality of control locations are physically positioned approximately between the television station antenna and the group of remote locations served thereby.

55. The method of claim 54 wherein in step (c) a plurality of data bits are transmitted from at least one remote location during at least some of the horizontal blanking intervals, and wherein the bit rate is a harmonic of the repetition rate of the horizontal sync signals, whereby the bit clocks at the remote locations and at the at least one central location may be synchronized by the ordinary television programming horizontal sync signal.

56. The method of claim 54 wherein the modulation of step (b) is a quadrature modulation.

57. The method of claim 45 wherein at each remote location, the transmission of step (c) is on a television antenna shared with at least one ordinary television receiver.

58. In an interactive television system, a method of communicating information from a plurality of remote receiver locations, each connected to a cable television system, to a central location, the cable television system receiving ordinary television programming over the air and providing the same over a cable having amplifiers at various points along the cable, each serving a plurality of remote locations, comprising the steps of:
(i) at each remote location;
   (a) modulating the information to be communicated from each remote location onto a carrier having a frequency in the frequency band of an unused cable television channel;
   (b) transmitting the modulated information on the cable only during at least some of the horizontal blanking intervals of an adjacent cable channel carrying ordinary television programming:
(ii) adjacent each cable amplifier
   (c) detecting the horizontal sync signals of a television channel broadcasting ordinary television programming over the air
   (d) transmitting the modulated information received on the cable over the air and in the frequency band of a television channel adjacent the channel referred to in step (c) only during at least some of the horizontal blanking intervals associated with the detected horizontal sync signals of the channel referred to in step (c); and
(iii) at at least one central location
   (e) receiving the transmissions of step (d) and detecting the information therein.

59. A method of information communication within an area utilizing the frequency band of a television channel adjacent to as well as that of a television channel serving the same area and broadcasting ordinary television programming, the programming including horizontal and vertical sync signals and associated blanking intervals, comprising the steps of:
   (a) modulating information on a plurality of subcarriers;
   (b) modulating the modulated information of step (a) onto the carrier of the television channel broadcasting the ordinary television programming, the subcarriers causing the modulation of this step (b) to result in frequency components within the frequency band of the television channel adjacent that of the television channel broadcasting ordinary television programming;
   (c) broadcasting the modulated information only during the horizontal blanking intervals of the ordinary television programming;
   (d) receiving the transmitted modulated information at a distant location and detecting the information therein.

60. The method of claim 59 wherein the modulation of step (b) also results in frequency components within the frequency band of the television channel broadcasting ordinary television programming.

61. The method of claim 59 wherein the modulation of step (b) is a single sideband modulation.

62. A method of determining the location of a mobile unit within an area utilizing the frequency band of a television channel adjacent to or the same as that of a television channel serving the same area and broadcasting ordinary television programming, including horizontal and vertical sync signals and associated blanking intervals, comprising the steps of:

(a) modulating identification information on a carrier within the frequency band of the television channel adjacent to or the same as that of the television channel broadcasting ordinary television programming;

(b) transmitting the modulated information only during the horizontal blanking intervals of the ordinary television programming;

(c) receiving the transmitted modulated information at the mobile unit and transponding the received information; and (d) receiving the transponded informtion and the television programming at at least two different central locations and determining the location of the mobile unit by differences in the transmission times of the received signals.

63. The method of claim 62 wherein a video carrier including horizontal and vertical sync signals and associated blanking intervals is broadcast during periods the ordinary television programming is not on the air.

* * * * *